US008121725B2

(12) United States Patent
Baker et al.

(10) Patent No.: US 8,121,725 B2
(45) **Date of Patent: *Feb. 21, 2012**

(54) APPARATUS, SYSTEM AND METHODS FOR DISPENSING PRODUCTS

(75) Inventors: Stuart C. Baker, Santa Ynez, CA (US); Daniel C. Finn, Valley Center, CA (US); Thomas F. Gaasch, Encinitas, CA (US); William K. Holmes, San Diego, CA (US)

(73) Assignee: Parata Systems, LLC, Durham, NC (US)

( * ) Notice: Subject to any disclaimer, the term of this patent is extended or adjusted under 35 U.S.C. 154(b) by 1895 days.

This patent is subject to a terminal disclaimer.

(21) Appl. No.: 10/927,167

(22) Filed: Aug. 26, 2004

(65) Prior Publication Data

US 2005/0236417 A1 Oct. 27, 2005

Related U.S. Application Data

(63) Continuation-in-part of application No. 10/830,365, filed on Apr. 22, 2004, now Pat. No. 7,228,200.

(51) Int. Cl.
*G06F 17/00* (2006.01)

(52) U.S. Cl. ............ 700/236; 700/237; 700/242; 221/7; 221/119; 221/133; 235/381

(58) Field of Classification Search .................. 211/119, 211/21, 121, 122, 117, 133, 130; 700/236, 700/237, 242; 221/7, 12, 4, 10; 235/462.08, 235/381

See application file for complete search history.

(56) References Cited

U.S. PATENT DOCUMENTS

| | | | | |
|---|---|---|---|---|
| 919,927 | A * | 4/1909 | Neuman et al. | 221/155 |
| 4,519,522 | A | 5/1985 | McElwee | |
| 5,014,875 | A | 5/1991 | McLaughlin et al. | 221/2 |
| 5,159,560 | A | 10/1992 | Newell et al. | |
| 5,385,265 | A * | 1/1995 | Schlamp | 700/242 |
| 5,390,711 | A * | 2/1995 | Murphey | 700/237 |
| 5,431,299 | A * | 7/1995 | Brewer et al. | 221/7 |
| 5,597,995 | A | 1/1997 | Williams et al. | 235/375 |
| 5,713,485 | A | 2/1998 | Liff et al. | 221/2 |

(Continued)

FOREIGN PATENT DOCUMENTS

JP 10-015441 1/1998

(Continued)

OTHER PUBLICATIONS

Notification of Reasons for Refusal from the Japanese Patent Office in reference to Japanese Patent Application No. 2007-509523.

(Continued)

*Primary Examiner* — Timothy Waggoner
(74) *Attorney, Agent, or Firm* — Myers Bigel Sibley & Sajovec

(57) ABSTRACT

Products are dispensed from a dispensing apparatus in which products marked with transaction information are received in a two-dimensional array of moveable bins. In response to control information synthesized from transaction information on the products in the bins and a dispense request, the array is operated to place a bin at a dispensing station on the dispensing apparatus. At the dispensing station, a mechanism is operated in response to the control information to provide access to the bin. A product in the bin may then be retrieved.

19 Claims, 28 Drawing Sheets

U.S. PATENT DOCUMENTS

| | | | | |
|---|---|---|---|---|
| 5,812,410 | A | 9/1998 | Lion et al. | 364/479.01 |
| 5,838,575 | A | 11/1998 | Lion | 364/479.01 |
| 6,068,156 | A | 5/2000 | Liff et al. | 221/7 |
| 6,152,364 | A | 11/2000 | Schoonen et al. | 235/375 |
| 6,230,927 | B1 | 5/2001 | Schoonen et al. | 221/10 |
| 6,256,967 | B1 | 7/2001 | Hebron et al. | 53/501 |
| 6,283,322 | B1 | 9/2001 | Liff et al. | 221/7 |
| 6,330,491 | B1 | 12/2001 | Lion | 700/237 |
| 6,338,007 | B1 | 1/2002 | Broadfield et al. | 700/231 |
| 6,352,200 | B1 | 3/2002 | Schoonen et al. | 235/375 |
| 6,438,451 | B1 | 8/2002 | Lion | 700/237 |
| 6,439,423 | B1 | 8/2002 | Suzuki | 221/81 |
| 6,449,927 | B2 | 9/2002 | Hebron et al. | 53/501 |
| 6,464,142 | B1 * | 10/2002 | Denenberg et al. | 235/462.46 |
| 6,471,089 | B2 | 10/2002 | Liff et al. | 221/13 |
| 6,529,801 | B1 | 3/2003 | Rosenblum | 700/237 |
| 6,547,097 | B1 | 4/2003 | Cavallaro et al. | 221/306 |
| 6,581,798 | B2 | 6/2003 | Liff et al. | 221/13 |
| 6,601,729 | B1 | 8/2003 | Papp | 221/25 |
| 6,650,964 | B2 | 11/2003 | Spano, Jr. et al. | 700/237 |
| 6,651,842 | B2 | 11/2003 | Collins et al. | 221/253 |
| 6,694,217 | B2 * | 2/2004 | Bloom | 700/215 |
| 6,697,704 | B2 | 2/2004 | Rosenblum | 700/232 |
| 6,766,218 | B2 | 7/2004 | Rosenblum | 700/235 |
| 6,814,255 | B2 | 11/2004 | Liff et al. | 221/13 |
| 6,892,941 | B2 | 5/2005 | Rosenblum | 235/383 |
| 2002/0177922 | A1 | 11/2002 | Bloom | |
| 2003/0088332 | A1 | 5/2003 | Rosenblum | 700/232 |
| 2003/0093181 | A1 | 5/2003 | Rosenblum | 700/232 |
| 2003/0204289 | A1 | 10/2003 | Banerjee et al. | |
| 2003/0216831 | A1 | 11/2003 | Hart et al. | 700/235 |
| 2004/0050855 | A1 | 3/2004 | Jurgenson | |
| 2004/0164146 | A1 | 8/2004 | Rosenblum | 235/381 |
| 2004/0215369 | A1 | 10/2004 | Rosenblum | 700/235 |
| 2005/0021175 | A1 | 1/2005 | Bain | 700/236 |
| 2005/0023286 | A1 | 2/2005 | Pinney et al. | 221/123 |
| 2005/0049746 | A1 | 3/2005 | Rosenblum | 700/232 |

FOREIGN PATENT DOCUMENTS

| | | | |
|---|---|---|---|
| JP | 11-185142 | | 7/1999 |
| WO | WO 01/31593 | A1 | 5/2001 |
| WO | WO 01/21402 | A1 | 3/2002 |
| WO | WO 02/21402 | | 3/2002 |
| WO | WO2005/005266 | A2 | 1/2005 |

OTHER PUBLICATIONS

Supplementary European Search Report for PCT/US2005012752, filed on Oct. 23, 2009.

* cited by examiner

APPARATUS, SYSTEM AND METHODS FOR DISPENSING PRODUCTS

PRIORITY

This is a continuation-in-part of U.S. patent application Ser. No. 10/830,365, filed Apr. 22, 2004 now U.S. Pat. No. 7,228,200 for "APPARATUS SYSTEM AND METHOD FOR DISPENSING PRODUCTS".

BACKGROUND

This specification concerns the dispensing of products from a dispensing apparatus in response to transaction information marked on the products.

Dispensing of products to consumers by automated means has been a feature of consumption-oriented economic infrastructure since at least the middle of the twentieth century, if not earlier. Initially, soft drinks and candy were provided from vending machines. Musical performance was dispensed to listeners by jukeboxes. Consumers obtained food from automats. One characteristic of these early machines was the physical and functional integration of sales activity, such as receipt of coins, with the automatic dispensation of products and services.

Currently, advances in transaction technology permit the sites of sale and dispensation to be separated physically, while providing great flexibility in functional and operational integration. Automation of the entire sale, including dispensing sold products, provides a manifold benefit. Distribution costs are cut, productivity is increased, and inventory and transaction data are efficiently managed and effectively documented.

However, as a result of advances in data processing, communications, and documentation, increasingly sophisticated sales transaction technologies have leapfrogged the technologies and modes of dispensing sold products, particularly in retail environments in which the consumers themselves, or their agents, retrieve or take possession of the products without having the products carried to them by an intermediary service. In this regard, "dispensing" refers to delivering or dealing out products from machines directly to recipients, and particularly to apparatus and systems from which recipients take possession of such products from such machines.

A machine or apparatus for dispensing products in a retail environment must make the most efficient use of the space which it occupies. That is to say, it must exhibit a high density of products per machine unit volume. The apparatus also must integrate with automatic transaction means in order to provide efficient and effective delivery of the products which it dispenses, especially in those cases when specific products are to be dispensed to specific recipients. The machine's ability to integrate with a manifold transaction system will also enhance its flexibility in terms of the variety of products that it can dispense and the variety of consumers it can dispense to. A dispensing machine invested with an appropriate degree of transaction functionality also may be able to operate autonomously, requiring integration only with inventory and transaction data management components. In cases where products, such as prescription drugs and devices, must be dispensed under privacy and regulatory constraints, the dispensing machine also must be capable of dispensing products securely to ensure safe delivery and satisfaction of the constraints.

SUMMARY

Products are distributed from a dispensing apparatus in which the products themselves or packages containing the products, marked with transaction information, are received in a plurality of moveable bins disposed in a two-dimensional array. In response to control information synthesized from a dispense request and transaction information on products or packages in the bins, bins in the two-dimensional array are moved to place a bin at a dispensing station on the dispensing apparatus. At the dispensing station, an access mechanism is operated in response to the control information to provide access to the bin. A product or a package in the bin may then be retrieved by or for an identified recipient.

SPECIFICATION

Dispensing Apparatus Embodiment

Figure 1:
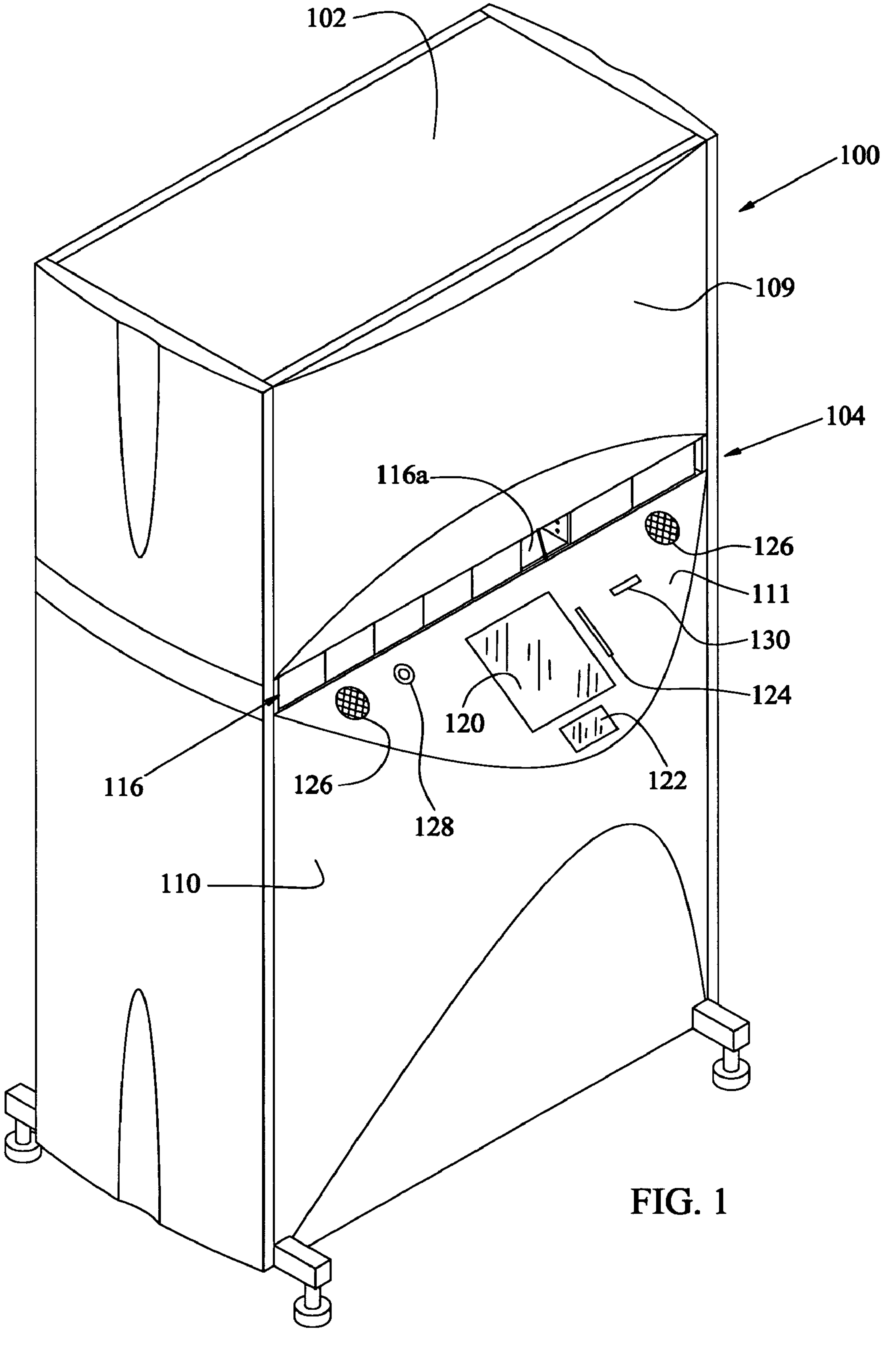
FIG. 1 is a front perspective view of a dispensing apparatus.
Figure 2:
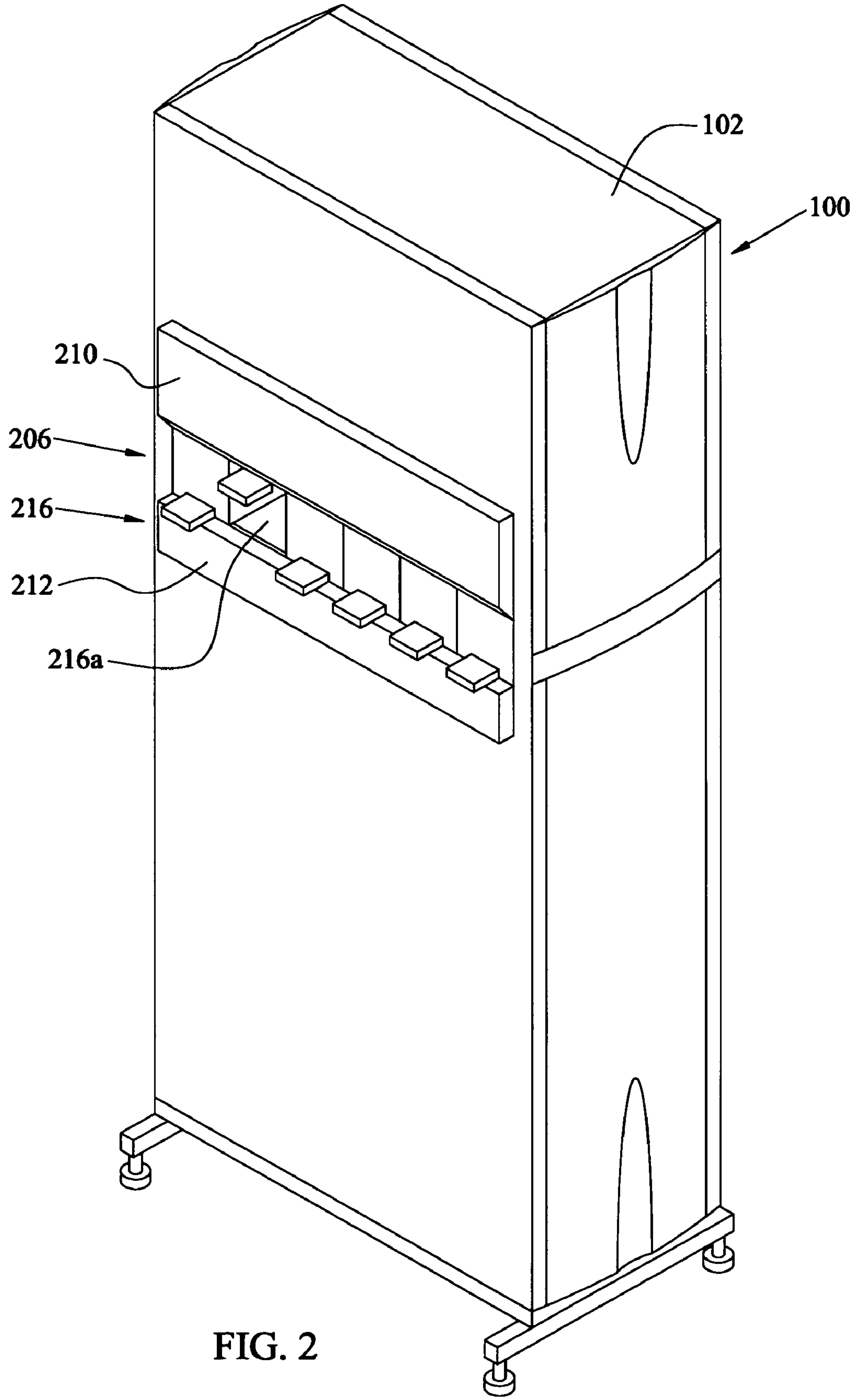
FIG. 2 is a rear perspective view of the dispensing apparatus of FIG. 1.

FIGS. 1 and 2 show a dispensing apparatus 100 having a housing, enclosure, or cabinet ("housing") 102, preferably although not necessarily, a six-sided one, made of sheet metal panels joined to each other and supported on a frame. The housing 102 is constructed so that the interior of the apparatus 100 is normally accessed by a user or consumer through a dispensing station 104 on the housing, and by administrative personnel through a loading station. Although FIG. 2 shows a loading station 206 on a side of the housing 102 opposite that where the dispensing station 104 is found, it is possible for the stations to be located on the same side of the housing, or even to share the same station location. Nevertheless, for the sake of illustration only, the stations 104 and 206 are shown at separate, oppositely situated locations.

The dispensing station 104 is positioned between a first shaped panel 109 and a second shaped panel 110. The second shaped panel has a surface 111 bordering the dispensing station. The dispensing station 104 may be constituted of an array 116 of normally locked or closed doors. The array 116 of doors may have one or more doors in it; the array is illustrated with eight doors, for example. The door 116*a* is shown opened for access. When a door at the dispensing station is opened to provide access to a product or package in a bin, the apparatus is said to "dispense" the product or package when the product or package is retrieved by or for a recipient.

The surface 111 which borders the dispensing station 104 constitutes a control panel that provides access to interface instruments for conducting a transaction. These instruments may include, for example, a touch screen panel 120, a signature pad 122, a magnetic stripe (card) reader 124, speakers 126, a camera 128, and a receipt slot 130. The control panel may provide access to fewer or more instruments than those shown.

In the dispensing apparatus example shown in the figures, which represents the case where the stations 104 and 206 are on opposite sides of the apparatus 100, the loading station 206 is constituted of a first raised cover 210, a second raised cover 212 disposed beneath the cover 210, and an array 216 of normally locked or closed doors situated between the covers 210 and 212. One door 216*a* is shown open at the loading station.

Figure 3:
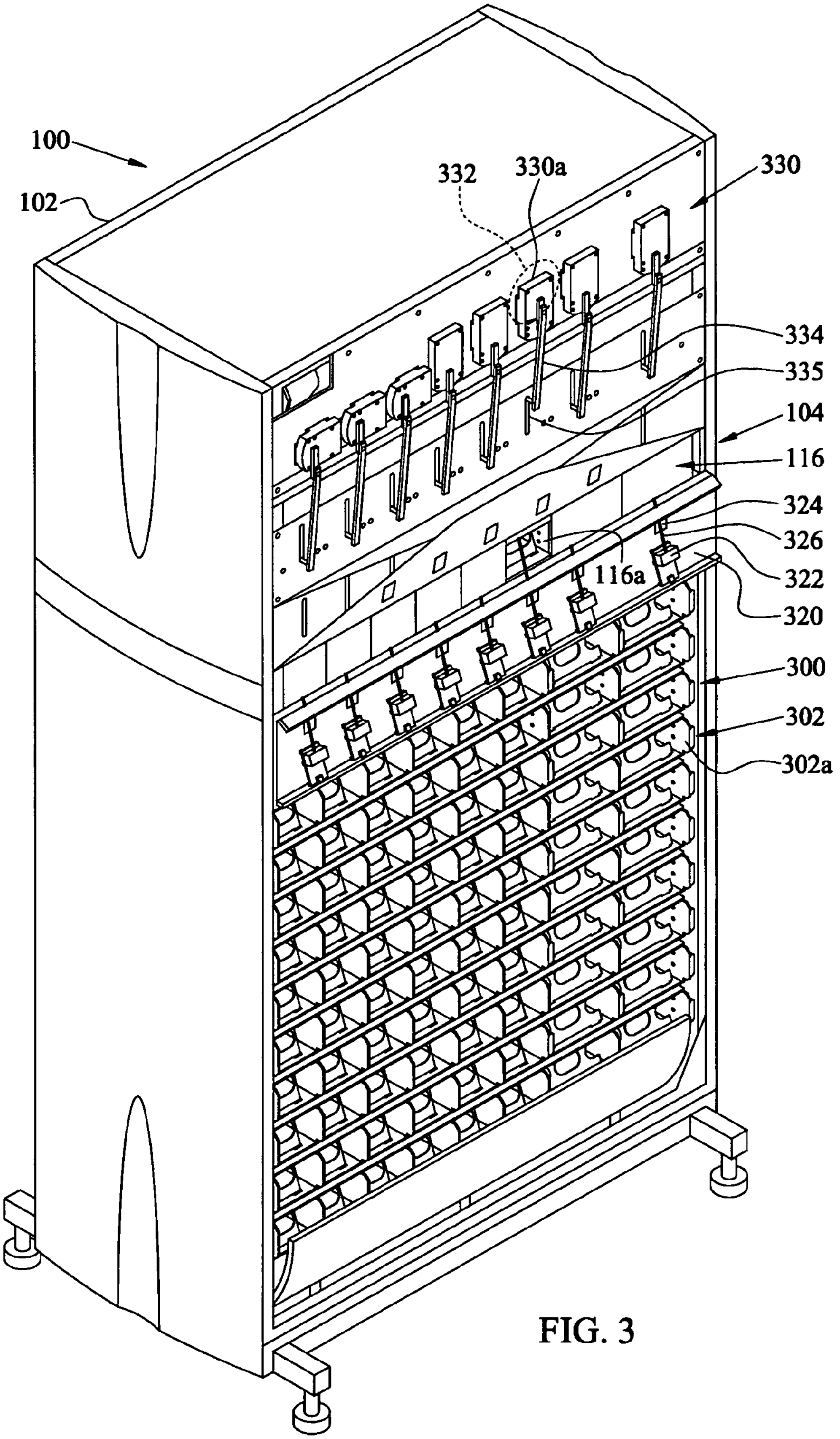
FIG. 3 is a front perspective view of the dispensing apparatus of FIG. 1, with a front cover partially removed to show details of a chain of bins and a dispensing station.
Figure 4:
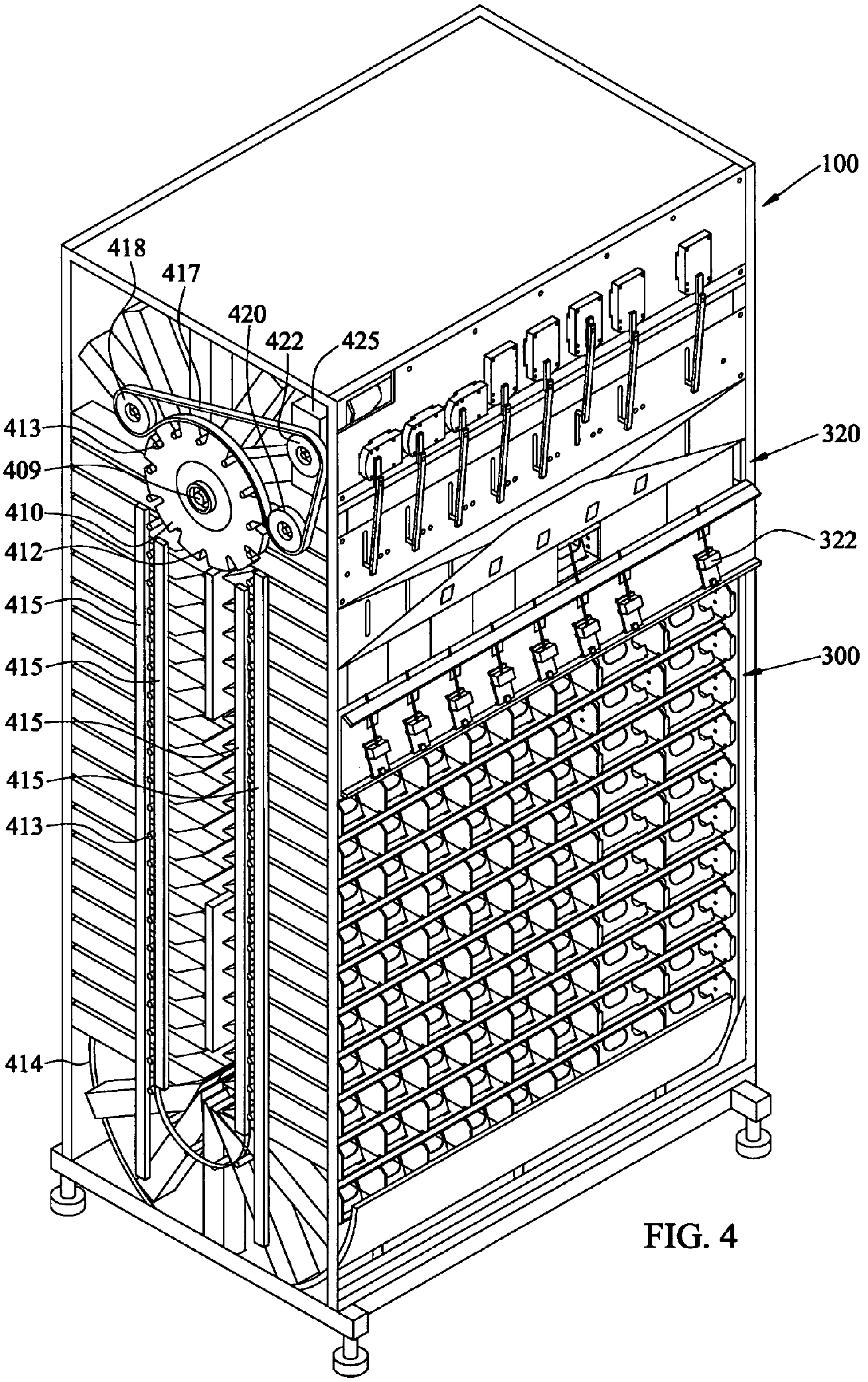
FIG. 4 is a perspective view toward a first side of the dispensing apparatus of FIG. 1, with front and side covers removed to show further details of the chain of bins and dispensing station.
Figure 5:
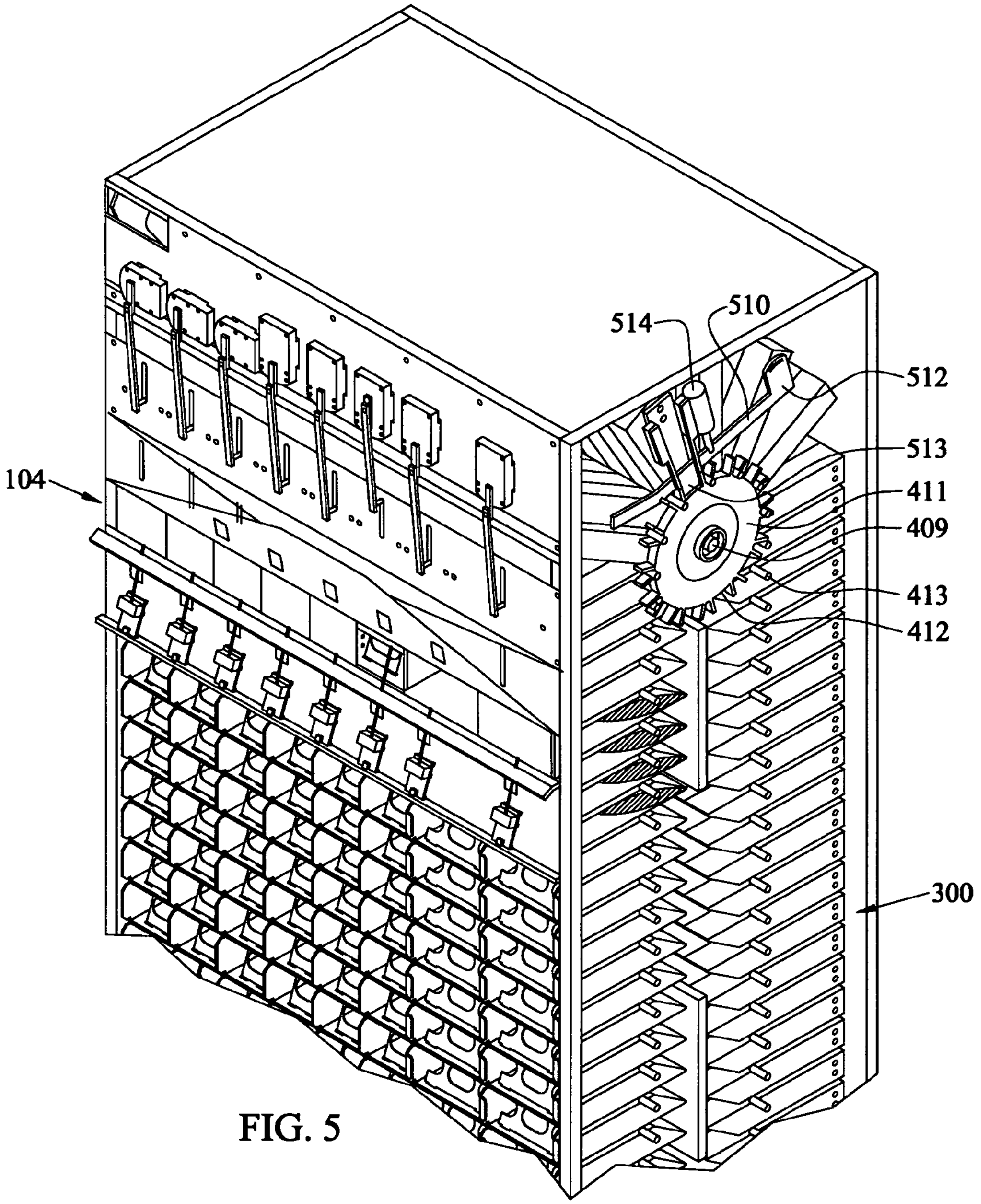
FIG. 5 is a perspective view toward a second side of the dispensing apparatus of FIG. 1, with front and side covers removed to show further details of the chain of bins.

In FIGS. 3, 4, and 5 panels of the housing 102 are removed to illustrate a mechanism constituted of a two-dimensional array of moveable bins. For example, the bins may be linked or connected to form a chain 300 that may be moved or transposed in either vertical direction. In the description that follow, the chain of bins is but an illustration of the two dimensional array of moveable bins. In this example, the ends of the chain 300 are linked together to form a continuous endless chain of bins. Alternatively, at least one link may be omitted, making the chain discontinuous. The bins are provided in a sequence of 1×n arrays each of which forms a row of the chain 300; one row is indicated by reference numeral 302, and one bin in the row 302 is indicated by reference numeral 302*a*. Each row may comprehend one or more bins.

The chain 300 of bins is moved by a mechanism in the housing 102 including at least one axle 409 (preferably substantially horizontal). A dive wheel 410 is mounted at one end of the axle 409, and a hub 411 is mounted at the other end. The drive wheel 410 and the hub 411 of the axle 409 are supported for rotation in bearings (not shown) in the side panels of the housing 102. The drive wheel 410 and the hub 411 include sprockets in their respective rims. A sprocket in each rim is indicated by reference numeral 412. The chain 300 is received over the drive wheel 410 and the hub 411 in the upper end of the housing 102, with cylindrical retainers 413 at the ends of rods which link the bins together engaged by the sprockets 412. In the lower end of the housing, a semicircular chute 414 made of low friction material such as Teflon is held against the chain 300 in order to guide the chain as it moves against the chute 414 and retain contents of the bins in the bins as the chain 300 moves through a bottom arc. Alternatively, a sheet of low friction material can be tensioned against the chain 300 in the lower end of the housing 102. Still other means for retaining the contents of the bins in the bins through the bottom arc include wire springs in the bins or belts outside the bins. Two pairs of guides 415 secured to each of the side panels of the housing 102 form channels which receive the cylindrical retainers 413 and stabilize the chain as it is moved or transposed in the housing 102. The chain 300 is moved in either vertical direction by a drive mechanism including a belt 417 that engages the drive wheel 410 that is visible in FIG. 4. The belt 417 is tensioned over the rim of the drive wheel 410 and over rollers 418 and 420, and engages the output hub 422 of a reversible electric motor 425. Alternatively, a motor can be coupled to directly drive the drive wheel 410, thereby dispensing with the belt and rollers.

When the chain 300 is stopped, it is retained in place by a retainer mechanism best seen in FIG. 5. The retainer mechanism includes a lock arm 510 rotatably secured at 512 to a side panel (not shown) of the housing 102. The arm has a dog 513 that engages the sprockets 412 on the rim of the hub 411. A solenoid 514 moves the arm 510 toward and away from the rim of the hub 411.

FIGS. 3, 4 and 5 also illustrate elements of the dispensing station 104 that are not visible in FIGS. 1 and 2. A panel 320 with raised elongate edges is secured to the frame of the housing 102 and extends across the width of the housing below and adjacent the dispensing location 104. An array of information sensors is supported on the panel 320 to sense or read information in the bins. One of the sensors is indicated by reference numeral 322. Preferably, the sensors are optical sensors such as bar code readers. Each sensor is given a line of sight into a respective bin by an aperture through the panel 320. The aperture for the sensor 322 is indicated by reference numeral 324, and its line of sight is indicated by 326. The aperture 324 enables the sensor 322 to read along the line of sight 326 without regard to the position of a door at the dispensing location. That is to say, the sensor 322 is able to sense the contents of a bin at the dispensing location when the door associated with the sensor 332 is open and when it is closed.

The doors 116 cover a bin row at the dispensing location, each door covering a respective, individually-accessible bin. The doors may be unlocked or unsecured and opened by means of handles if dispensation of the products is not subject to security constraints. In other cases, security constraints may require locking of the doors while the constraints are satisfied. For dispensing constrained by security, the doors 116 are individually controlled by motors 330, with each motor coupled to open and close a door by a rotatable linkage. For example, the motor 330*a* has a member that it rotates as indicated at 332. The member is linked by a rotatable joint to an elongate arm 334. The arm 334 is, in turn, linked to the door 116*a* on a trunnion that rides up and down in the slot 335. The motor 330*a* operates in response to a command, rotating its member in the direction 332, which draws the arm 334 upwardly to the position shown in FIG. 3. The arm's upward motion draws the door 116*a* up, exposing the opening to the bin behind the door 116*a* and providing access to its contents. Another command reverses the sequence, moving the door 116*a* down and closing the opening to the bin. With the door closed, the motor 330*a* is maintained in a locked position which prevents the door 116*a* from being opened manually. Each of the doors at the dispensing location works in this way.

Figure 6:
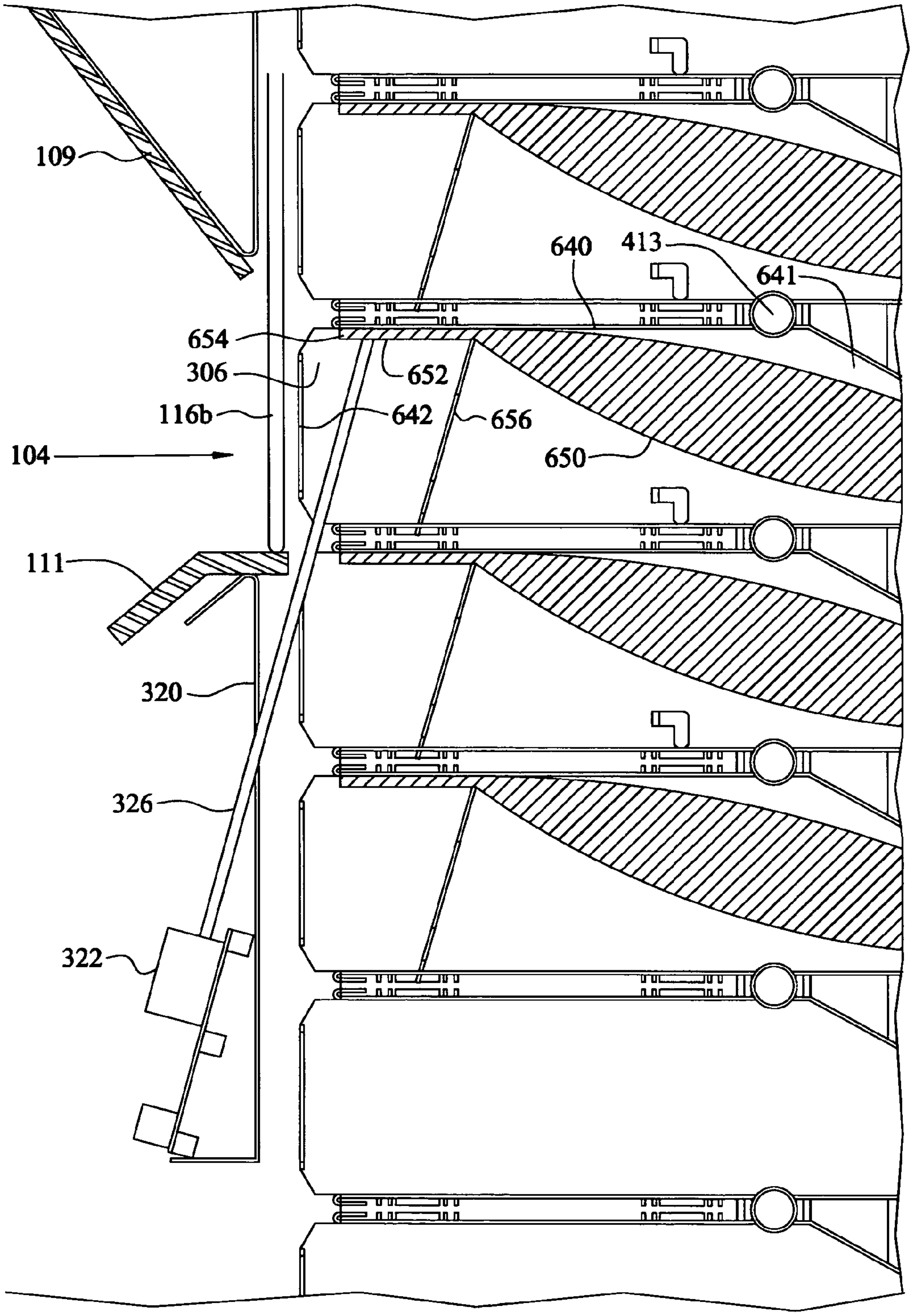
FIG. 6 is an enlarged, partially schematic side view that shows the structure and operation of the dispensing station.

FIG. 6 illustrates elements of the exemplary dispensing station described above with respect to FIG. 4. In this figure, a bin 306 is positioned at a closed dispensing station door 116*b*. The bin 306 is representative of all bins in the chain 300. The bin 306 is an elongated box 640 having a closed tapered end 641 and a rectangular open end 642. When a bin is positioned at a door, its open end faces the door. Each bin may contain a product or package retained at an information sensing location in the bin. For example, the bin 306 has disposed in it a package 650 (also shown alone in FIG. 7) with a thin end 652 on which transaction information 654 is printed or affixed or positioned. For example, the transaction information may be in the form of an optically-discernable bar code. The thin end 652 is urged to a predetermined information-reading position against an upper side of the elongated box 640 near its open end to retain the thin end 652 where the transaction information may be sensed or read. When the bin 306 is at the dispensing station, the predetermined information-reading position is in the line of sight 326 of the sensor 322 adjacent the door 116*b*. In the example shown in these figures, a retainer 656 integral with the package 650 retains the package 650. Preferably, the package 650 is flexible, made of plastic film or reinforced paper, and the retainer 656 is semi-rigid, made of cardboard or thin plastic, so that it will buckle, flex, or bend. The retainer 656 has holes formed in it for easy insertion into and removal from a bin. The retainer 656 acts between a side of a bin and the thin end 652 such that the transaction information 654 is positioned in the line of sight 326 of the sensor 322. The sensor 322 is thus enabled to read the transaction information on a product or package in the bin 306 or, if the bin is empty, status information on the side of the bin in the line of sight 326. Such information may signify that the bin is empty.

A loading station for the dispensing apparatus may be separate from the dispensing station just described and located on an opposite side of the housing, as shown in FIGS. 1 and 2. In this case, the loading station is constituted of the same elements as the dispensing station, in an inverted relationship, because the endless chain configuration of the chain inverts the bins at the loading station (with respect to the bins at the dispensing station) and requires inversion of the information sensors at the loading station, with respect to the orientation of the information sensors at the dispensing station. That is not meant to so limit the application of the principles of the dispensing apparatus, and the dispensing and loading stations may be located on the same panel of the housing, in which case they would be identically configured and oriented. Or, the same station could be used to load and dispense products or packages.

Figure 7:
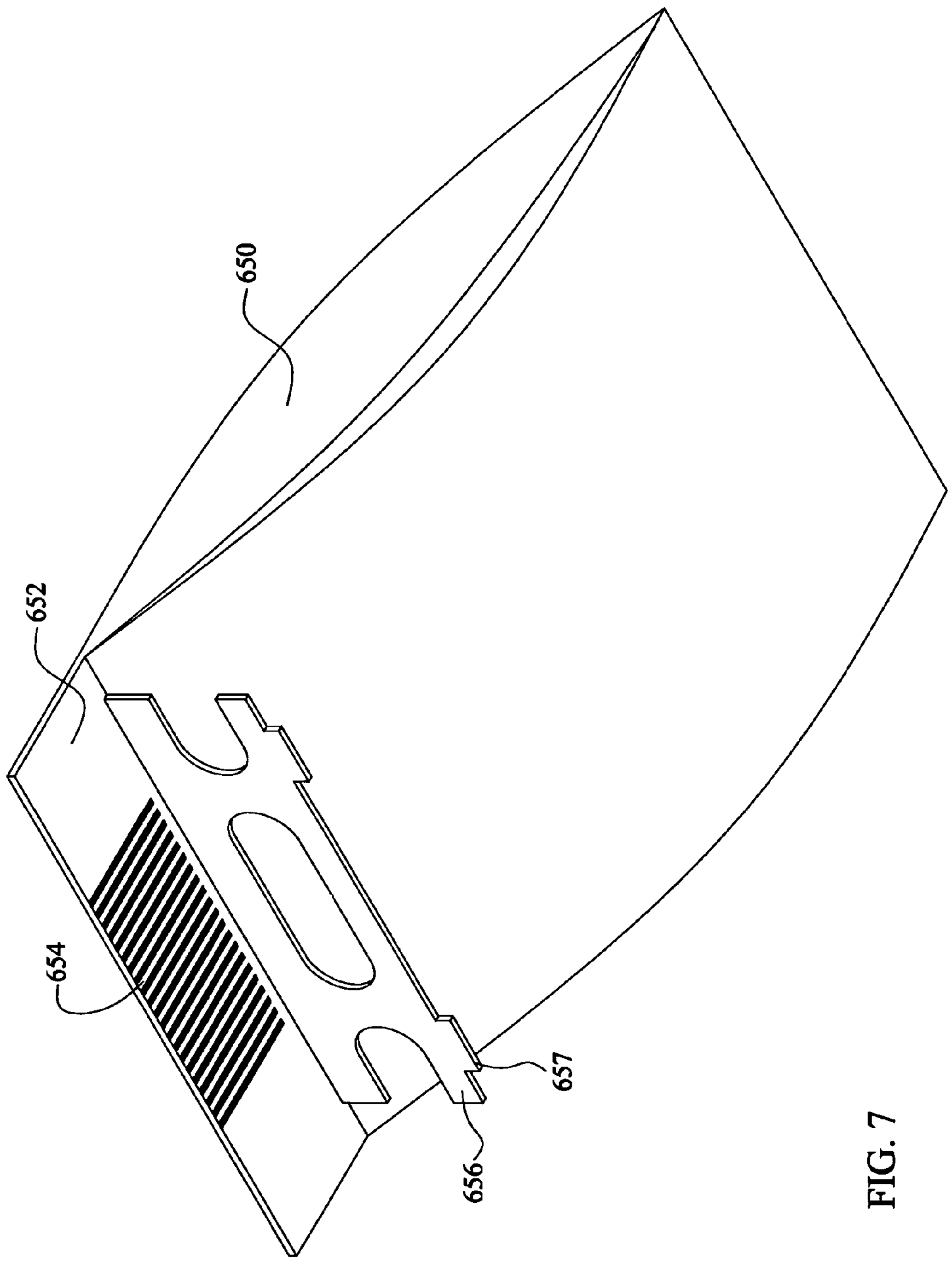
FIG. 7 is a side perspective view of a package for use with the dispensing apparatus of FIG. 1.

FIG. 7 provides an example of a product intended to be dispensed from a dispensing apparatus such as the dispensing apparatus 100. The product is contained in the package 650 with a transaction information location on the thin end 652 where transaction information 654 is received. This is not meant to limit the application of these principles. The product in the bins may or may not be packaged. Alternatively, or in addition, the bins may be lined with coverings to protect their inner surfaces. Preferably the lining would be removable and extracted when the product or package is taken from a bin. The transaction information location may be on the product or a package or envelope containing it. In the case illustrated in FIG. 7, a label receives and retains transaction information related to the product. Thus, with reference to FIGS. 6 and 7, the package 650 is received or loaded in the bin 306 such that the label is situated at or near an information-reading position in the bin 306 where it can be read by the sensor 322 at the dispensing station 104 and by its counterpart at the loading station 206. The transaction information on a product or package may include, for example, a random code, an identification of the product, a price, an inventory number, and so on; it may also contain the identification of a recipient who has paid for the product, or who is authorized or required to receive it. The transaction information in the label and the bin status information may be coded in some standard format, and must be discernible by the information sensors at the dispensing and loading stations. For example, the transaction information and the bin status information may be on a label in the form of a bar code, on a device bearing an RF code, on an identification tag, or any equivalent. Further, the label may be written to as well as read from in situ. The product, package, or envelope is loaded into a bin such that the transaction information may be sensed (or not) at both the loading and the dispensing stations.

Figure 8:
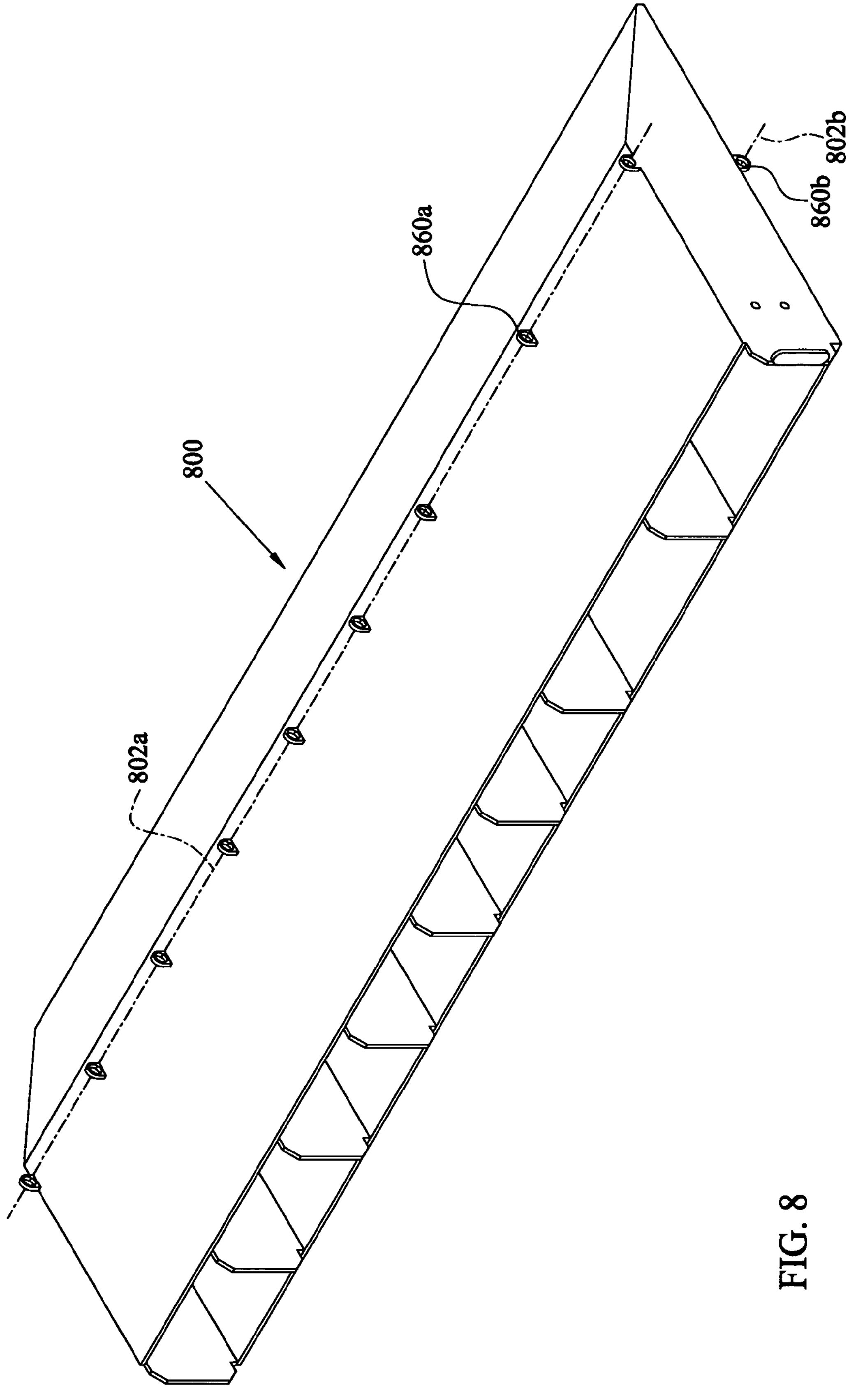
FIG. 8 is a side perspective view of a row of bins in a chain of bins.

The plurality of bins in the dispensing apparatus is assembled first into a plurality of bin rows, such as the bin row 800 shown in FIG. 8, and then into a chain such as the chain 300 shown in FIG. 5. Each bin row is preferably, although not necessarily, one-dimensional and may contain one or more bins of the same or different widths. The bin rows may be made of sheet metal, molded plastic, or other suitable materials. As seen in FIGS. 5 and 8, each side of a bin row has a plurality of coupling eyelets 860*a* and 860*b* disposed in two elongate alignments in alignment with the edge where the bins transition to their closed, tapered ends in the row. The coupling eyelets on one side of a bin row are aligned with a coupling eyelet alignment on an adjacent bin row and joined by a rod (not shown) so that the bin rows are linked to form a chain of bin rows. For example, the bin row of FIG. 8 is linked to one adjacent bin row by a rod (not shown) along the axis 802*a*, and to another adjacent bin row by another rod (not shown) along the axis 802*b*. The tapered ends of the bins permit those ends to be moved together and apart as the chain 300 travels around the axles at each end of the housing; see FIG. 4, for example.

Figure 9:
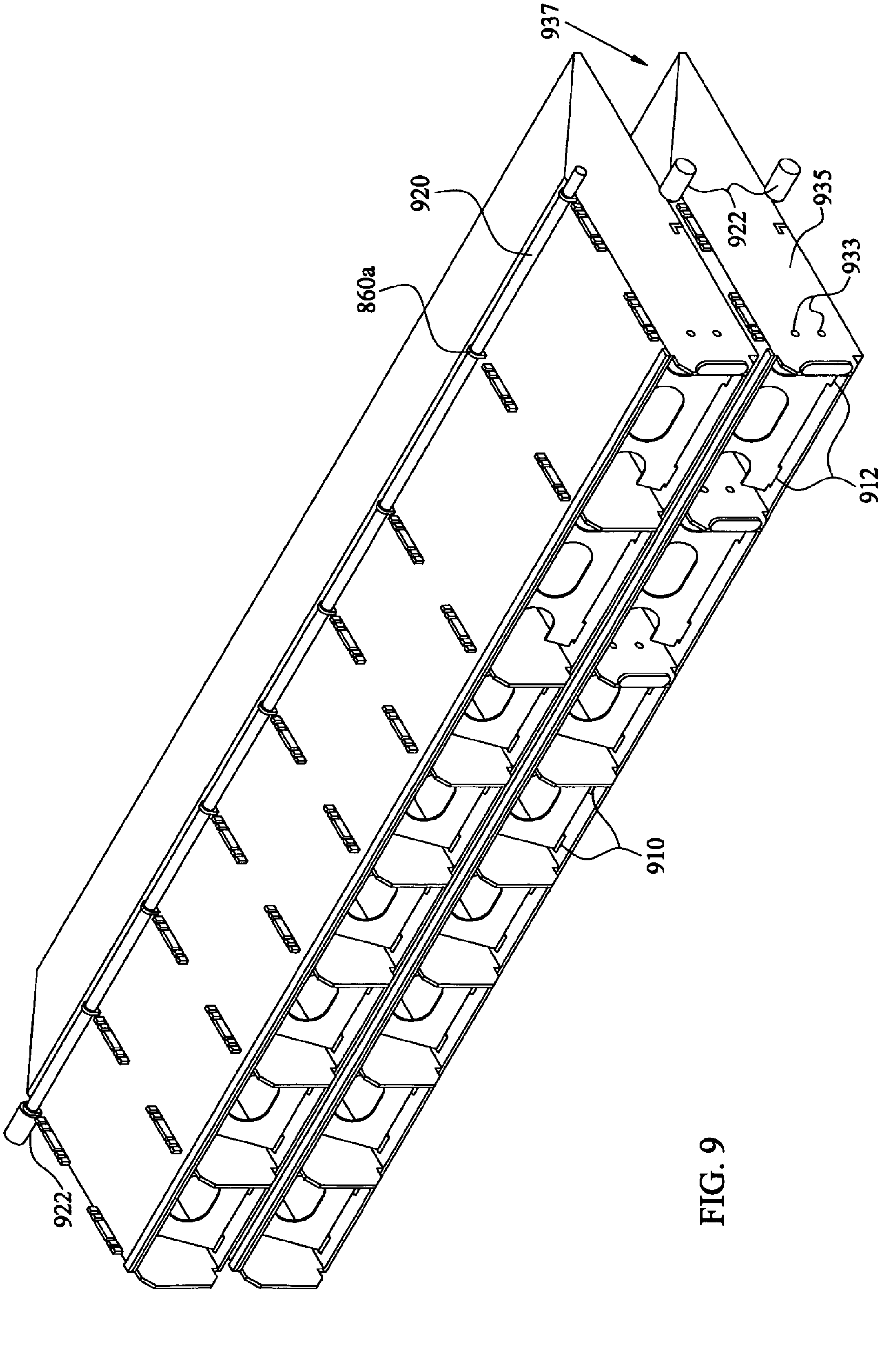
FIG. 9 is a side perspective view of a portion of the chain of bins.

FIG. 9 shows two bin rows assembled as described into a chain portion. One rod 920 is shown received in eyelets 860*a* on one side of a bin. The rods are retained in the eyelets by cylindrical retainers 922 secured to the ends of the rods; one such retainer is shown on one end of the rod 920. These are the elements of the chain 300 that are engaged by the sprocketed drive mechanism shown in FIGS. 3 and 4. Also visible in FIG. 9 are two modes of retaining packages such as the package 650 in the bins. As seen in FIG. 7, the semi-rigid retainer 656 has two spaced-apart tabs 657 on its lower edge. These tabs may engage bumps 910 or slots 912 formed on or in a surface of each bin.

The chain configuration supports a particularly efficient use of the footprint area and volume of the dispensing apparatus 100, which makes the apparatus particularly useful for commercial retail environments. For example, presume that the apparatus has the rectangular configuration illustrated in FIGS. 1-4. We have designed such a dispensing apparatus with the following bin dimensions:

outside width=40.70 in.
outside depth=21.62 in.
outside height=78.00 in.
outside volume=68,635 $in.^3$
inside width=39.72 in.
inside depth=19.62 in.
inside height=75.00 in.
inside volume=58,448 $in^3$ and the following bin dimensions:

depth=9.25 in.
height=2.5 in.
width=37.52 in.
quantity=56 bins
total bin volume=48,588 $in.^3$ giving a utilization factor inside the apparatus of 48,588/58,448=83%, and outside the apparatus of 48,588/68,635=71%.

Processing System

Figure 10:
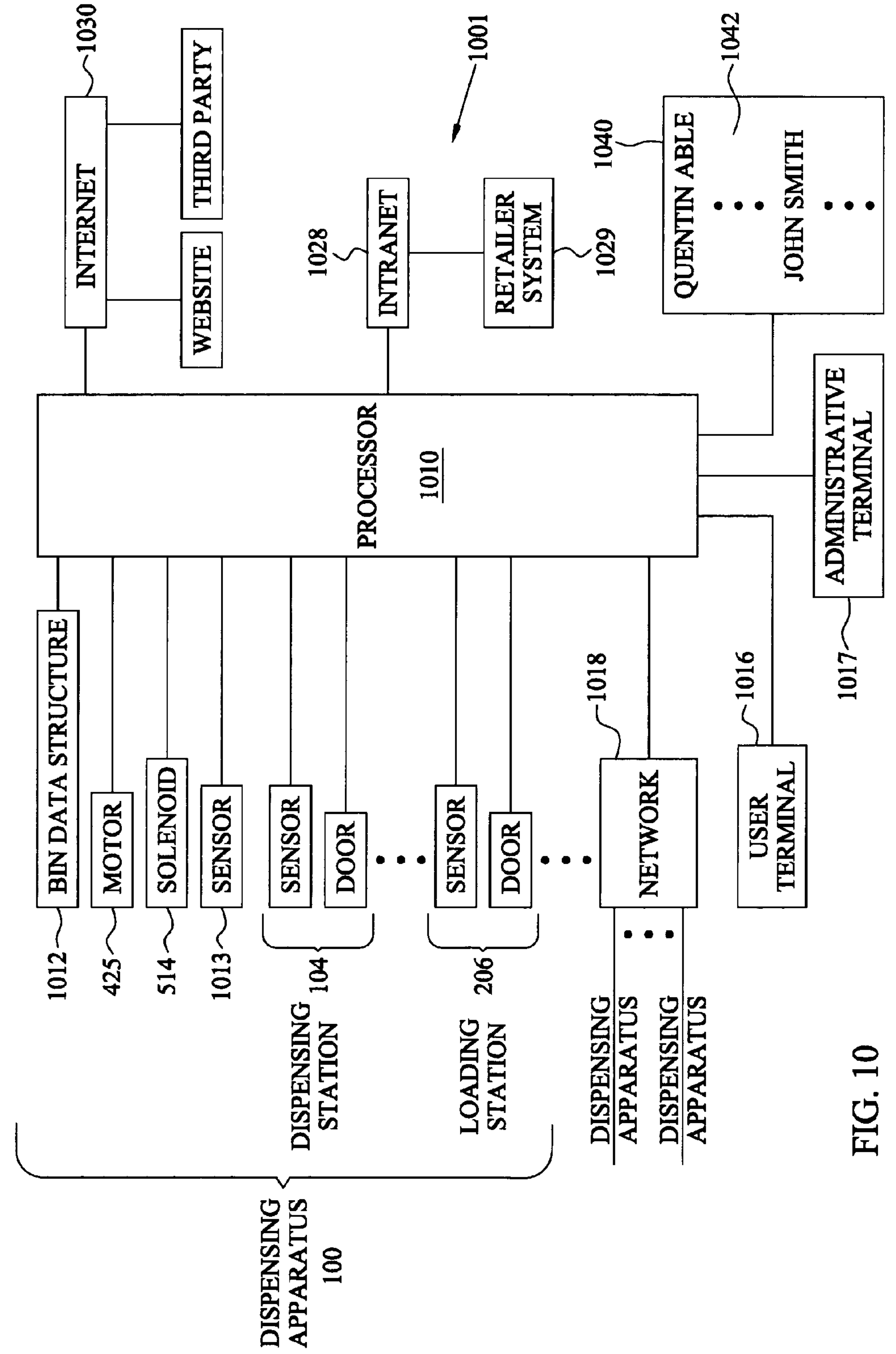
FIG. 10 is a system block diagram illustrating the integration of the dispensing apparatus with an automated transaction system.

FIG. 10 illustrates a processing system 1001 that may be connected in whole or in part to the dispensing apparatus 100 to control its operations. In this regard, one of the functions of the processing system 1001 is to act as a controller of the dispensing apparatus. However, as will become clear, this is but one of a number of functions which the processing system 1001 may perform in connection with the operation and use of one or more dispensing apparatus. In fact, the processing system 1001 has a manifold functionality that enables a dispensing apparatus to operate autonomously as a stand-alone dispensing system. The processing system 1001 may also constitute a functional node by which the dispensing apparatus may be integrated with other dispensing apparatus and other processing systems in an enterprise architecture or in a more widely-dispersed system.

The processing system 1001 may be wholly integrated into the structure of the dispensing apparatus, or may be located in whole or in part outside the dispensing apparatus. For illustration, the following discussion presumes that the processing system 1001 is integrated physically into the structure of the housing 102. But this is not intended to be limiting nor to exclude other possibilities. For example, the processing system 1001 may be in a kiosk and may serve one or a plurality of dispensing apparatus from a kiosk separate from the dispensing apparatus.

Referring to FIG. 10, the processing system 1001 includes a programmable processor unit (hereinafter, "processor") 1010. The processor 1010 has connections to multiple devices, units, and networks. Some of these are shown in FIG. 10 as point-to-point connections for illustration and discussion only. In fact, connectivity at the device, module, and functional levels will be matters of design choice based on available technology and actual device and system configurations.

The processor 1010 maintains (in storage, not shown) programs and data structures for conducting transactions involving the dispensing apparatus 100, including loading and dispensing a product or products, as well as for other related functions. One data structure ("the bin data structure") 1012 relates each bin of the plurality of bins in the chain 300 to its content status, which includes transaction information relevant to products or packages in the bin.

Bin row location information is provided by an information sensor 1013 located in the housing 102. The sensor 1013 is connected to the processor 1010 to provide location information relative to the chain 300. In this regard, the sensor 1013, at a known location in the housing 102, may read information from the sides of the bin rows identifying the bin row that is currently at or passing the sensor's location. Such information may be as simple as uniquely marking one bin row as ROW 0 (the first row in a two-dimensional matrix having a number of rows equal to the number of bin rows in the chain) and marking all other rows with a common mark. With reference to FIG. 9, such a mark may include, for example, two circles 933 on a side 935 of the bin rows. Then when the first row is sensed, a row count is initialized (or reinitialized) and incremented each time another row passes the sensing location. Alternatively, a servo may be used.

Dispensing is initiated by the processor 1010 upon receipt of a request to dispense a product. Such a request is referred to as a "dispense request". A user terminal 1016 is connected to the processor 1010 to enable users to generate and send dispense requests to the processor 1010 and to receive information related to the transaction from or by way of the processor 1010. The user terminal may be located on a single dispensing apparatus for use with that apparatus, or, with that apparatus as master (or server), for use with that apparatus and one or more other dispensing apparatus (as slaves, or clients). The user terminal may also be located on a kiosk separate from any dispensing apparatus that it serves. Wherever located, the user terminal 1016 may, for example, include the set of input elements shown at the surface 111 in FIG. 1, including the card reader 124, the touch screen 120, the electronic pad 122 for receiving a signature, and the camera 128. Information regarding or related to the transaction may be provided by the user terminal 1016 to the user by, for example, the output elements shown at the surface 111, including the touch screen 120, the speakers 126, and the receipt printer 130. The processor 1010 is connected to receive the dispense request, and additional information, from the user terminal 1016.

Administrative personnel, such as employees, contractors or agents of a retailer system in possession or control of a dispensing apparatus may require access to the functionality of a dispensing apparatus in order to conduct administrative tasks such as loading or unloading products and/or initiating an inventory procedure. Of course, the user terminal 1016 under a multi-level authorization scheme can provide such access. However, in some applications or deployments of a dispensing apparatus, a separate terminal may be desirable, useful, or even required. Thus, an administrative terminal 1017 also may be provided with a dispensing apparatus.

The information sensors and door motors at the loading station 206 and the dispensing station 104 are connected to the processor 1010 for operation thereby. The processor 1010 is also connected to control the operation of the motor 425 and solenoid 514, and thereby is enabled to cause the chain 300 to move or to be positioned for loading and dispensing operations. Similar connections for additional dispensing apparatus may be afforded by a multi-access configuration 1018 such as a bus or network. In this latter regard, the connections for the dispensing apparatus 100 would be made via 1018.

The processor 1010 is also connected to a local, private, or enterprise network ("intranet") 1028 for the retailer system 1029 whose products are dispensed. The processor 1010 may also be connected to a communication network 1030 in the form of, for example, a public telephone network or a wide area network, such as the Internet through which the dispensing apparatus can be accessed for receipt or delivery of information and or messages respecting or related to a transaction or the contents of one or more bins. For example, once a bin is loaded with a product or package, transaction information on the product or package may include an e-mail address at which a message may be delivered to notify a recipient of the message of the availability of the product for dispensation. Programming would enable the processor 1010 to compose and send such a message by, for example, text messaging, e-mail, instant messaging, facsimile and other equivalent modes. Finally, the processor is connected to an output device 1040, such as a display or banner board, on which a list 1042 of recipients ("recipient list") of contents of the dispensing apparatus 100 may be provided. The list is maintained and updated by the processor 1010 as contents are loaded and dispensed.

Bin Data Structure

Figure 11:
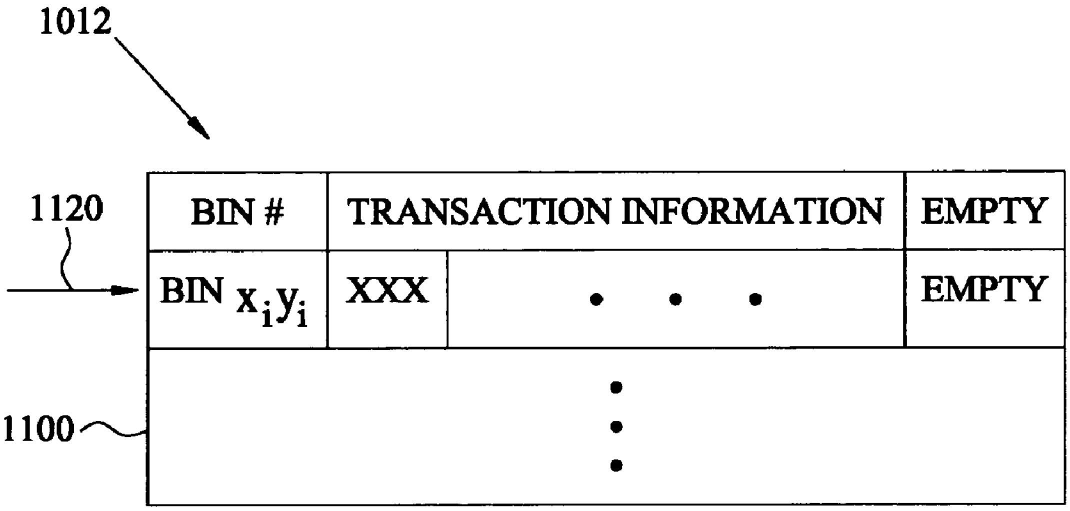
FIG. 11 is a schematic representation of a relational data structure containing transaction information.
Figure 12:
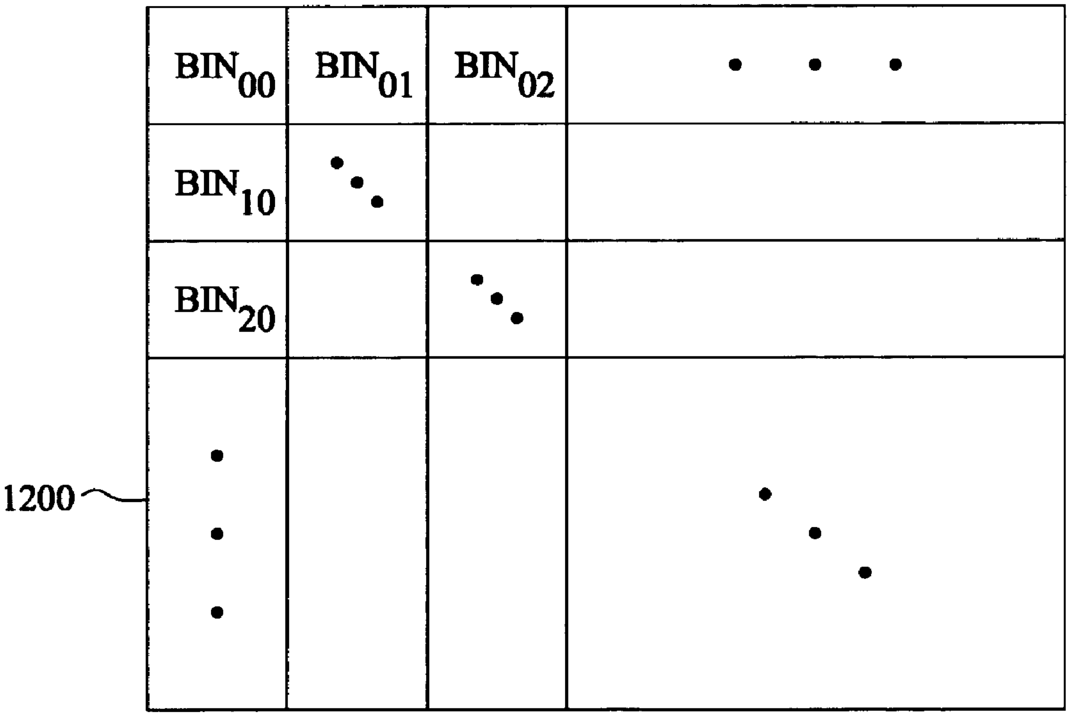
FIG. 12 is a schematic representation of a two-dimensional matrix relating bins in an array of bins of bins to the data structure of FIG. 11.

FIG. 11 illustrates a representative embodiment of the bin data structure 1012 containing transaction information that may be stored and accessed by the processor 1010 for management and control of the operation of a dispensing apparatus. The illustration shows a relational structure in the form of a table 1100, but the relational structure may take other forms such as a list, a tree, a map, or any other data structure capable of supporting the organization and systematic searching of information in a database of transaction information. The table has records, each record associated with a bin in the chain 300. Each row has a field Bin # in which a bin is identified, one or more fields for Transaction Information respecting the recipient of a product or package in the identified bin and other information about the product or package, and may have a field Empty denoting either that the bin is empty or that it holds a product, package, container, envelope, or the like. The Bin # field lists the bins by an appropriate code in an order that can be quickly scanned. For example, the relational structure may represent a two-dimensional matrix of bins. In this regard, with reference to FIGS. 11 and 12, imagine that the chain 300 has one link removed and is laid flat on a supporting surface. In this aspect, it is manifest that the chain 300 corresponds to a two-dimensional matrix 1200 of bins, in which each bin row corresponds to a respective row $x_i$ in the matrix, each bin has a row position $y_i$ corresponding to a column of the matrix, and each bin is uniquely identified by its location in the matrix, e.g., by the identifier BIN ($x_i$, $y_j$). Thus, the bin identifiers can be placed in the bin data structure 1012 as an ordered table, list, map, tree, or other equivalent structure easily and quickly scanned by program means executed by the processor 1010. The bin data structure 1012 relates BIN ($x_i$, $y_j$) with the transaction information on any product, package, container, envelope, or the like loaded into the bin. The bin data structure 1012 supports further management of the chain 300. For example, respective cursors representing the dispensing and loading stations may be maintained and moved through the bin data structure 1012 to track the bin rows currently positioned at or moving past the stations. With reference to FIG. 11, a cursor 1120 in the bin data structure 1012 would indicate that the bin row constituting the ith row ($x=x_i$) is at the dispensing station 104. Further, with the example shown, the processor 1010, using the values of $y_j$, is enabled to relate each door of the array 116 to a specific one of the bins in the ith row.

Of course, those skilled in the art will realize that the bin data structure is implicit in the two-dimensional array 1200 of bins and that the array 1200 may itself serve as the bin data structure. Such a bin data structure would be scanned by moving the array past the sensors at a dispensing and/or loading station, which may be a time-consuming process depending on the speed with which bins can be moved.

Transaction Information

Transaction information is intended to enable the identification and location of a package in the two-dimensional array of bins in order to dispense or unload the package and/or to maintain an inventory. Transaction information may take many forms. It may be complete in the information on the package and stored in the bin data structure, or it may be produced by merging information placed on the package and stored in the bin data structure with other information, including, for example, information contained in, or located outside of the bin data structure. Transaction information may include any one or more of a unique code, an identification of the product, an identification of a recipient of the product, a price, an inventory number, and so on. The transaction information may be combined with information from a host system in order to complete a transaction or perform an inventory update. In one example, the transaction information may be a unique code, randomly assigned by and known to the host system, on a package in a bin, and stored in the bin data structure at the bin location. Upon verification of the identity of a person via a user terminal, the host system may associate the unique code with the identified person and issue a command to dispense or unload a package bearing the unique code, leaving dispensing apparatus functionality the task of locating the bin containing the package and moving the chain to place the bin at a station to dispense or unload the package.

Load and Dispense Operations

Operations of a system, such as the system 1001 of FIG. 10, and methods for dispensing and unloading products from and loading products to a dispensing apparatus such as the apparatus 100 are illustrated in the flow diagrams of FIGS. 13A through 13D. For convenience, the operations and/or methods are referred to as "procedures". These figures also represent software programming that may be entered into the processor 1010 of the system 1001 to configure it for executing instructions to operate the system and to perform the method. Such instructions may be provided in a software program stored on a program product that may be coupled to a processor for programming the processor. For convenience and a clear understanding, the procedures of these figures are explained with reference to the dispensing apparatus 100 and the system 1001. Further, the arrangement of bins is still illustrated as a chain of bins with the understanding that this configuration is merely illustrative if a two-dimensional array of moveable bins.

Figure 13A:
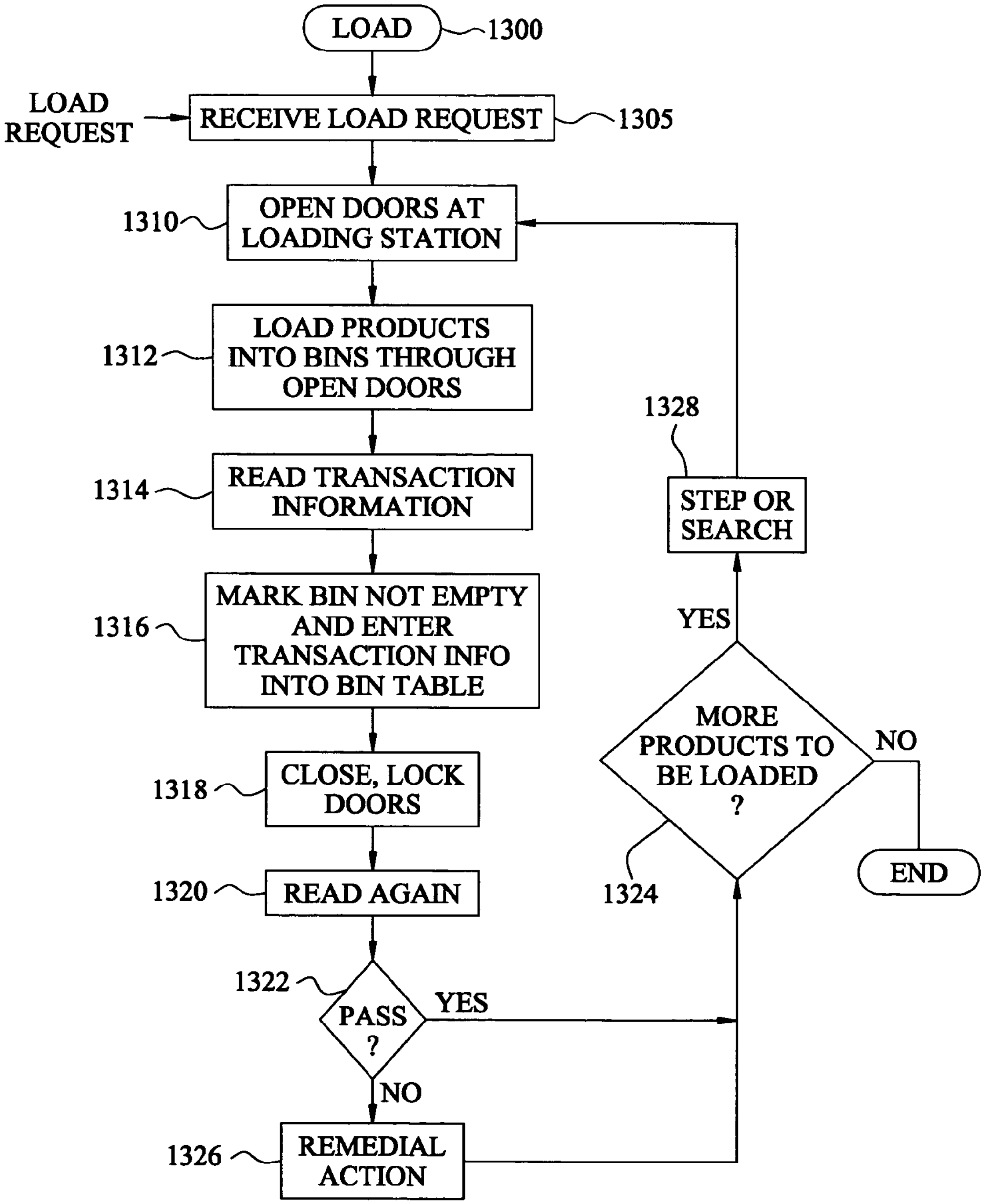
FIGS. 13A and 13B are flow diagrams illustrating methods, executable by a programmed processor and embodied in a software program product, for operating the dispensing apparatus to load and dispense products.

In FIG. 13A, a LOAD procedure is illustrated. This procedure presumes loading is done by an administrative person (for example a pharmacist or a pharmacist's assistant) by way of a loading station, although loading also may be done at a dispensing station. With reference to FIG. 13A and to FIG. 10, the procedure begins at step 1300 with initialization of the bin data structure 1012 and may include initialization of the recipient list 1042. In step 1305, a load request is entered. The load request may be received from an administrative terminal, such as 1017, a user terminal, such as 1016, or a retailer system, such as 1029. The load request may be to load a single product, or to lead sequentially load a plurality of products, and further may designate a required bin size. The load request causes the system 1001 to locate at least one empty bin near the loading station and move the chain to place the row containing the bin at the loading location. Of course, the bin row may contain more than one empty bin. With the chain stationary and the bin row positioned at the loading station, a door at the loading station is opened at step 1310 so that a product may be loaded into the bin exposed by the open door.

In step 1312, the product is received in the bin situated at the loading station, being loaded so that the transaction information is located at a position where it can be sensed by an information sensor at the loading station. In step 1314, the transaction information is read from the product received in the bin at the loading station. The bin's status is changed to "Not Empty" and transaction information is entered into the bin data structure 1012 in step 1316, either from the information sensor at the loading station, from the retailer system 1029, or from other data entry means (not shown) available to the loading personnel. In any case, when the product has been loaded into all of the bins to be loaded in the row currently positioned at the loading station, the door at the loading station is closed and locked in step 1318, and the transaction information from the product in the bin may be read again (1320) and compared (1322) against the information stored in the bin data structure 1012 for the bin. If the transaction information read from product in the bin at the loading station correlate with the transaction information stored for the bin in the bin data structure 1012, the positive exit is taken from decision 1322. Otherwise, the negative exit is taken and remedial action is executed at step 1326, Remedial action can consist of any action appropriate to the circumstances, including indicating a bin or bins whose contents are in question and opening doors at the loading station to permit repositioning the product or products in the bins. From the positive exit out of the decision 1322, or when the remedial action is completed, the procedure transitions to decision 1324 to determine whether any products remain to be loaded. If not, the procedure cycles through the decision 1324 through its negative exit to the end of the procedure. Otherwise, the positive exit is taken from decision 1324 and the chain is moved at step 1328 to search for and place another empty bin at the loading location for loading. This loading procedure is useful for loading products sequentially into bins via a loading station. Variations of the procedure are possible. For example, a row moved to the loading station may contain more than one empty bin, in which case, the procedure may use another empty bin in the row after the positive exit from the decision 1324. Further, doors to more than one empty bins in a row may be opened simultaneously to receive a product in each before the doors are closed and locked.

Figure 13B:
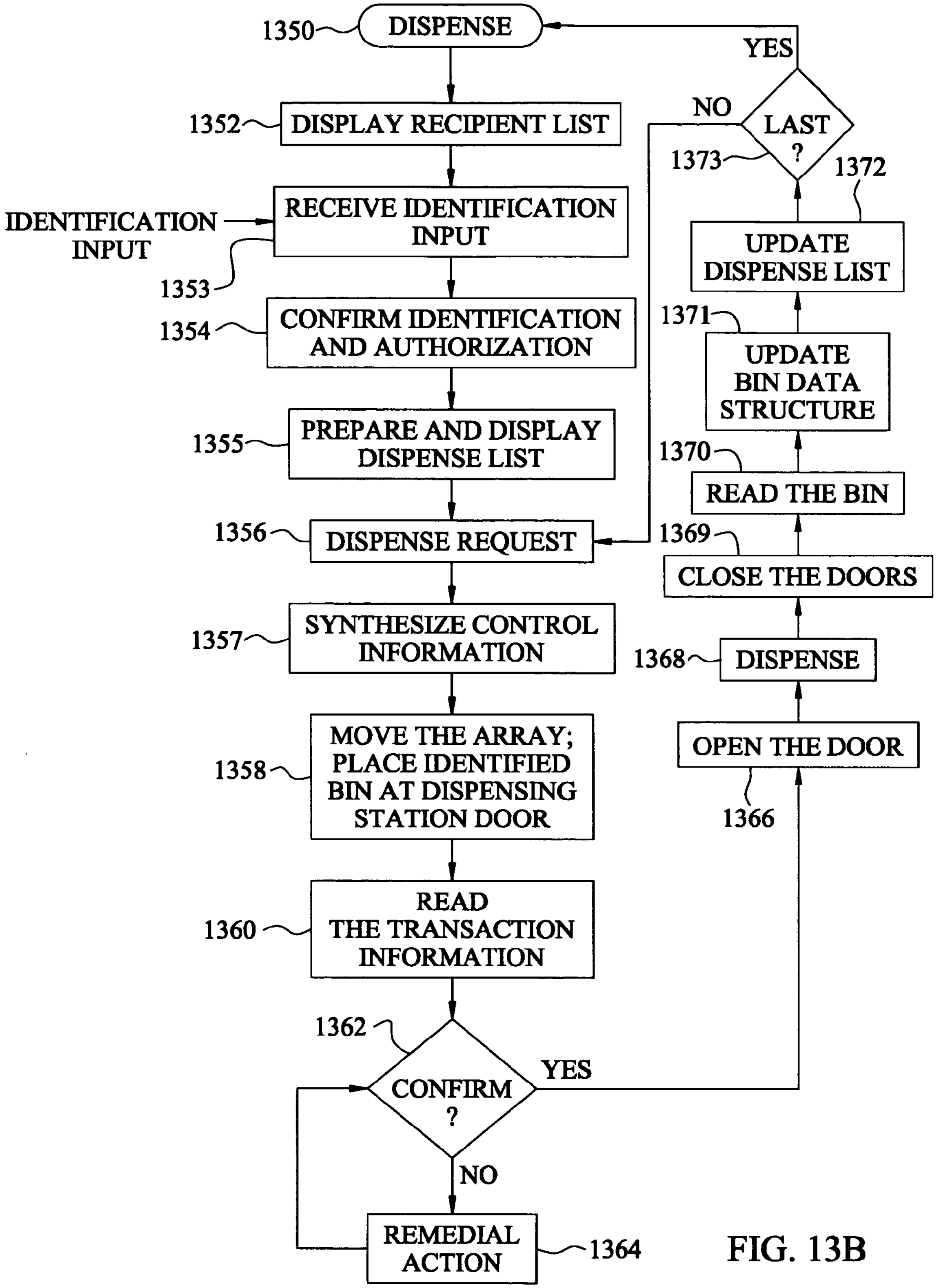

In FIG. 13B, a DISPENSE procedure is illustrated. This procedure may dispense a single product to a recipient from a dispensing apparatus, or may dispense more than one product to the recipient. The DISPENSE procedure may be understood with reference to FIG. 13B and FIG. 10. The DISPENSE procedure begins at step 1350. If recipient identification information is available for dispensing, the recipient list 1042 may be initialized and then output in step 1352. The procedure awaits an identification input in step 1353. An identification input preferably identifies or enables the identification of a recipient who is to receive one or more products from the dispensing apparatus. The recipient may be a single person, an agent or representative of a person, a member of a group, or a person otherwise authorized to receive products from the dispensing apparatus. The identification input is preferably received through a user terminal, such as the terminal 1016, although administrative personnel may enter a dispense request by way of an administrative terminal, such as the terminal 1017. An identification input may take any form that enables the system 1001 to identify the person and to confirm the authority of the identified person to receive one or more products that have been loaded into dispensing apparatus bins. An identification input may be embodied in a token, a PIN number, private information, biometric information, or any other equivalent. Once an identification input is received in step 1353, the procedure, in step 1354, confirms the identification of that person based on the identification input and confirms the authorization of that person to receive one or more products from the dispensing apparatus. The DISPENSE procedure then transitions to step 1355 where the bin data structure 1012 is scanned to determine products that have been loaded into the dispensing apparatus for the identified person, and which bins those products have been loaded into. When all of these products have been determined and located, the system 1001 returns the results in a dispense list to the user. For example, the dispense list may be in the well-known "shopping cart" format listing the products that have been located in the dispensing machine for the identified person and permitting the user to select among the listed products. Selection of a product from the dispense list initiates a dispense request or command for that product in step 1356. Control information for the bin containing the requested product is synthesized by the system 1001 in step 1357. In step 1358, the control information is used to move the chain so as to place the identified bin at the dispensing location. In this regard, the control information is provided to the motor 425 to cause it to move the chain so as to position an identified bin at the dispensing location. In response to the control information, the solenoid 515 is operated to release the locking arm 510 and then the chain is moved by the motor 425 to place the identified bin at the dispensing station by moving the bin row containing the bin to the dispensing station. After the chain has been moved, the motor 425 is deactivated and the solenoid is operated to engage the locking arm 510 with the rim of the hub 411. In step 1360, at the dispensing station, the processor 1010 reads the output of the information sensor at the $y_j$ value of the identified bin. If the transaction information read from the product in the identified bin at the dispensing station correlates with the transaction information stored for that bin in the bin table 1012, the positive exit is taken from decision 1362. Otherwise, the negative exit is taken and remedial action is executed at step 1364, Remedial action can consist of any action appropriate to the circumstances, including moving the bin to the loading station for checking its contents. From the positive exit out of the decision 1362, or when the remedial action is completed, the procedure transitions to step 1366 where the door at the location is opened. The user is then able to retrieve the contents of the bin in the dispensing step 1368. At this step, when the contents of the bin are removed, the information sensor monitoring the opened bin reads or senses the information on the bin indicating that the bin is empty. After this, in step 1369, the door is closed. The bin may be read again in step 1370 to confirm that the bin is empty. In step 1371, the bin data structure 1012 is updated to indicate that the bin is empty, and the dispense list is updated in step 1372 to reflect the dispensing of a selected product. In decision 1372, the dispense list is checked and the negative exit is taken, transitioning the procedure to step 1356 if the last selected product has not been dispensed. If the last selected product has been dispensed, the positive exit is taken from decision 1373 and the display recipient list may be updated, if used, in step 1352. Whether or not the recipient list is used, the DISPENSE procedure transitions to step 1353 to await the next identification input. Of course, the procedure may include steps to provide for other possible outcomes, such as failure of the door to open after elapse of a predetermined time, and failure to remove a product even after the door is opened and closed.

In the DISPENSE procedure of FIG. 13B, selection from the dispense list initiates a dispense request in 1356. In this regard, a dispense request causes a product to be dispensed from the dispensing apparatus and also causes an update of the bin data structure 1012. The dispense request may be initiated each time a product is selected and then queued until the shopping cart is executed. The request may also be initiated only when the shopping cart is executed and then executed for each product in the shopping cart. In any event, while there is a dispense request pending for a product in the dispense list, the negative exit is taken from decision 1373, and the dispense request is executed beginning in step 1356. In any event, when all requested products have been dispensed, the positive exit is taken from decision 1373 and the procedure transitions as described above.

It should be noted that the exemplary dispense procedure described above may be performed by a self-identified recipient of dispensed products or by an agent of such a recipient. An agent of a recipient may include, for example, a family member put in possession of the necessary identification or previously authorized to receive products for the recipient. An agent may also include administrative personnel such as employees or agents of the retailer system who are authorized to act on behalf of recipients. In this latter regard, for example, a pharmacist or a pharmacist's assistant may be authorized in the system 1001 to cause a dispensing apparatus to dispense a product for an identified recipient. Operating through an administrative terminal, such as the administrative terminal 1017, for example, the authorized administrative person would enter a code identifying himself or herself, followed by entry of the recipient's identification input. The resulting dispensing request or requests would be fulfilled and the product or products placed in the recipient's possession by the authorized administrative person.

One desirable use of the dispensing apparatus, system and methods described above is to dispense products securely, which is afforded by automatic operation of the doors at the loading and dispensing stations, and control of the action by the identification input and dispensing request. The door opening mechanism prevents random, self-initiated, unauthorized access to products in the chain of bins. The synthesizing of control information from transaction information and identification-initiated dispensing requests enables the further limitation of dispensing to defined conditions, including limitation to specifically authorized recipients.

For example, if the dispensing apparatus is deployed for dispensing prescribed pharmaceutical products in a commercial retail establishment such as a drug store, the transaction information on the products would include information respecting the product and also may include information identifying the recipient. In order to satisfy requirements for privacy, the identification could be encrypted or stored separately from the product. The identification input required for generating a dispense request for the product may include any one or more of entry and check of a signature, entry of a personal identification number, swiping a credit card, or inputting biometric or other personal information. These actions would enable the processor 1010 to formulate and encrypt and/or separately store information identifying the recipient. When an unfilled prescription is delivered to a pharmacist, the product is prepared and packaged, transaction information is generated and placed on the package, the package is loaded into a bin in the chain of bins, and the bin data structure is updated with the transaction information for the bin. At the same time, the recipient's name may be added to the recipient list 1042. Then, a recipient or recipient agent enters the establishment to retrieve the filled or finished prescription, may check the recipient list 1042 for the recipient's name, and completes the identification input at the user terminal 1016 to generate a dispense request correlated to recipient identification information. The processor 1010 receives the recipient request, scans the bin list for transaction information which may contain information identifying or enabling the identification of the recipient, and identifies the bin containing the product. In response to the identification-initiated dispense request and the transaction information, the processor synthesizes control information that causes the chain to move in order to place the identified bin at the dispensing station. The door where the bin is located is opened, and the DISPENSE procedure is completed as described above in connection with FIG. 13B.

Figure 13C:
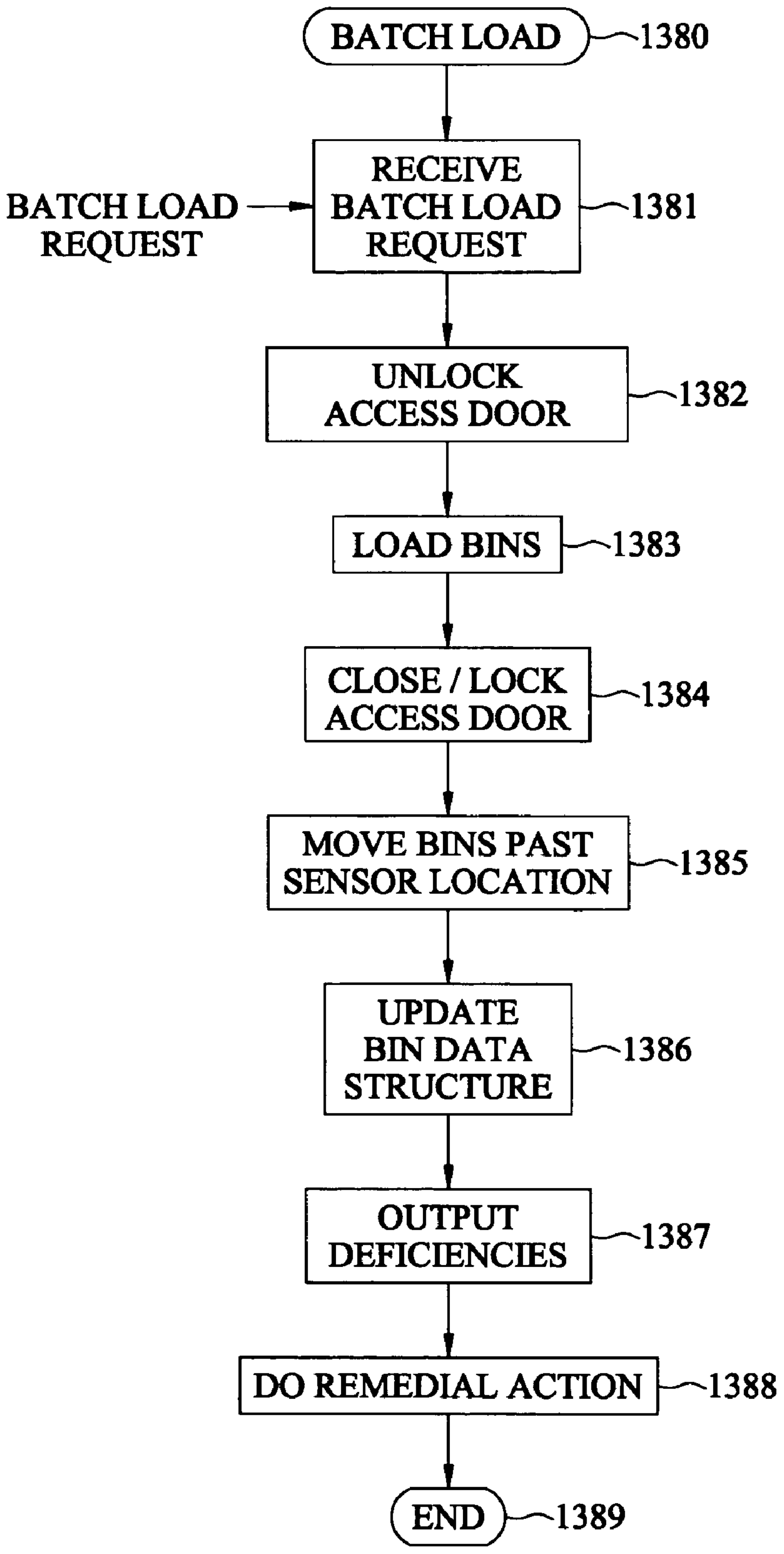
FIGS. 13C and 13D are flow diagrams illustrating methods, executable by a programmed processor and embodied in a software program product, for operating the dispensing apparatus to batch load products and to inventory the contents of the dispensing apparatus.
Figure 17:
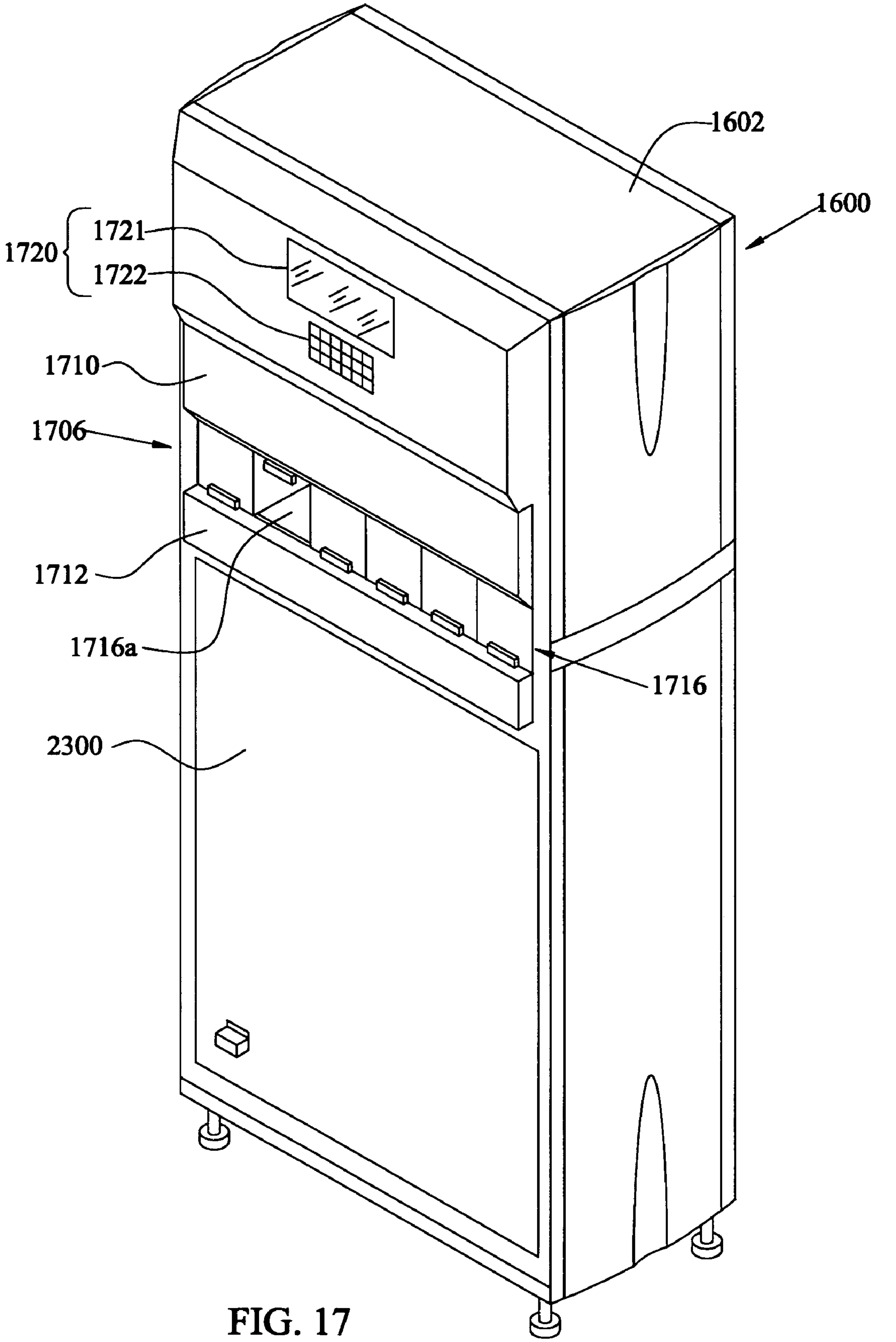
FIG. 17 is a rear perspective view of the dispensing apparatus of FIG. 16.
Figure 23:
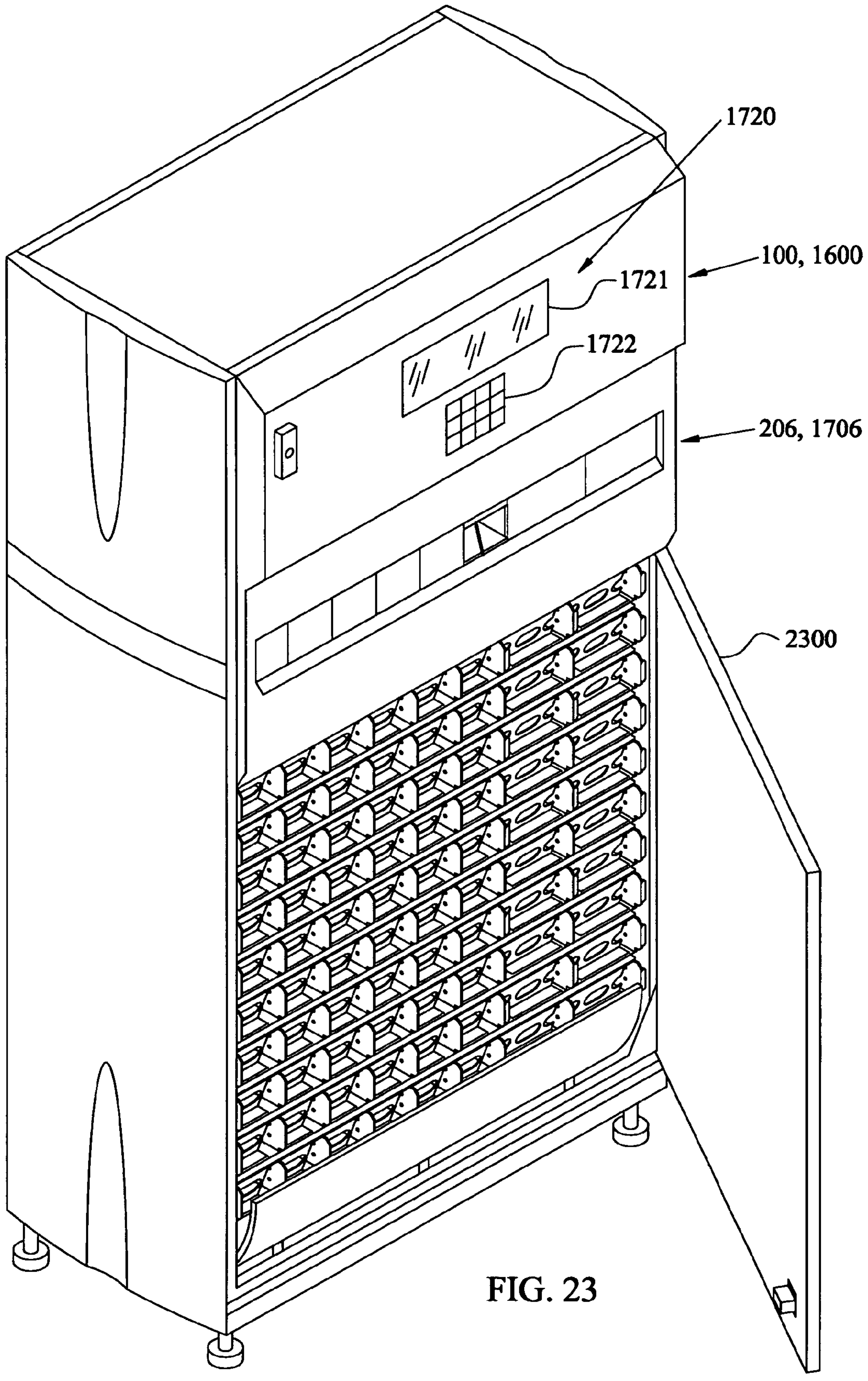
FIG. 23 is a rear perspective view of the dispensing apparatuses of FIGS. 2 and 17 with a door.

In FIG. 13C a BATCH LOAD procedure is illustrated. This procedure presumes that the dispensing apparatus housing may be opened as by a door to provide administrative personnel with access to multiple rows of bins in order to load them quickly with products. Such a door is illustrated in FIGS. 17 and 23 and is described in greater detail below. The BATCH LOAD procedure begins at step 1380 with initialization of the bin data structure 1012. In step 1381 a batch load request is received when an authorized administrative person inputs a code or uses a key to unlock and open the door. With the door opened in step 1382, multiple products are loaded as described above into bins in step 1383. During loading, the chain 300 may be moved to provide access to empty bins as bins are filled. Such movement may result from action of the authorized administrative person inputting a command to the system 1001 by way of an administrative terminal. When loading is completed, the door 2300 is locked, completing step 1384 and transitioning the procedure to step 1385 wherein the system 1001 moves the chain 300 past a sensor location, for example a load or dispense station. While the chain moves and bin contents are sensed, the bin data structure 1012 is updated in step 1386 by adding transaction information from the batch-loaded products. An inventory database may be updated at the same time. Any deficiencies noted by the system 1001, including misread information, are indicated to the authorized administrative person by way of a user terminal, a visual signal apparatus, or an audible signal apparatus in step 1387. The specific deficiencies may be listed on an output device on a user or administrative terminal. If necessary to correct detected deficiencies, appropriate remedial action is taken in step 1388, and the procedure ends at step 1389.

Figure 13D:
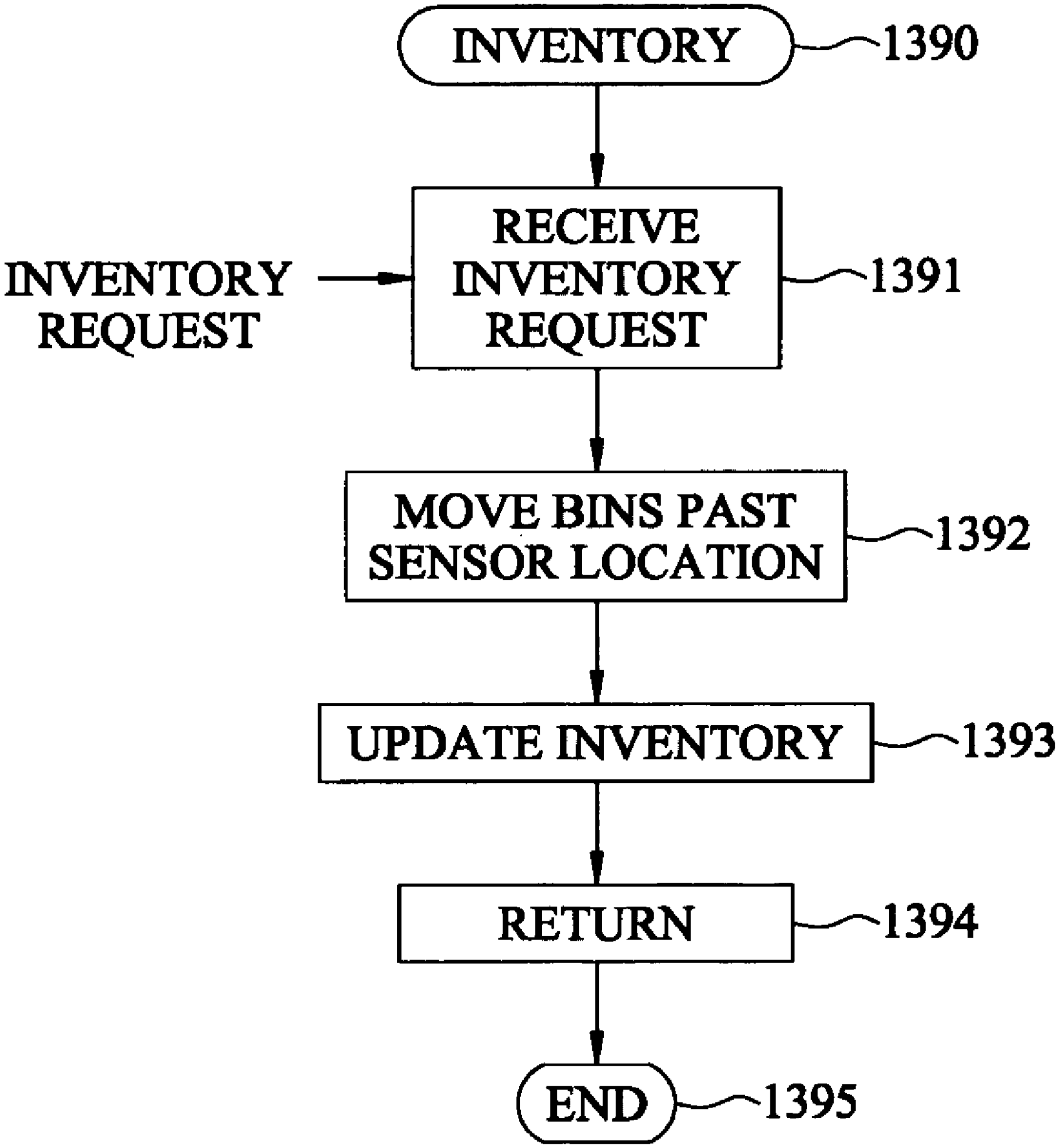

In FIG. 13D an INVENTORY procedure is illustrated. This procedure presumes that identified administrative personnel are enabled to issue an inventory request or command by way of an administrative terminal, for example the administrative terminal 1017. Alternatively, the inventory request may be issued by automated means in the system 1001. The inventory request may specify all, or part, or parts of the chain. The inventory request is received in step 1391. In response, the chain is moved past a sensor location, for example at a loading or dispensing station, where the transaction information on the packages is read in step 1392. When part or all of the chain has been read, an inventory database is updated in step 1393. At the same time, the bin data structure 1012 may also be checked and updated. When the requested inventory is completed, the procedure returns an acknowledgement in step 1394 ands ends in step 1395.

Secure Placement

Figure 14:
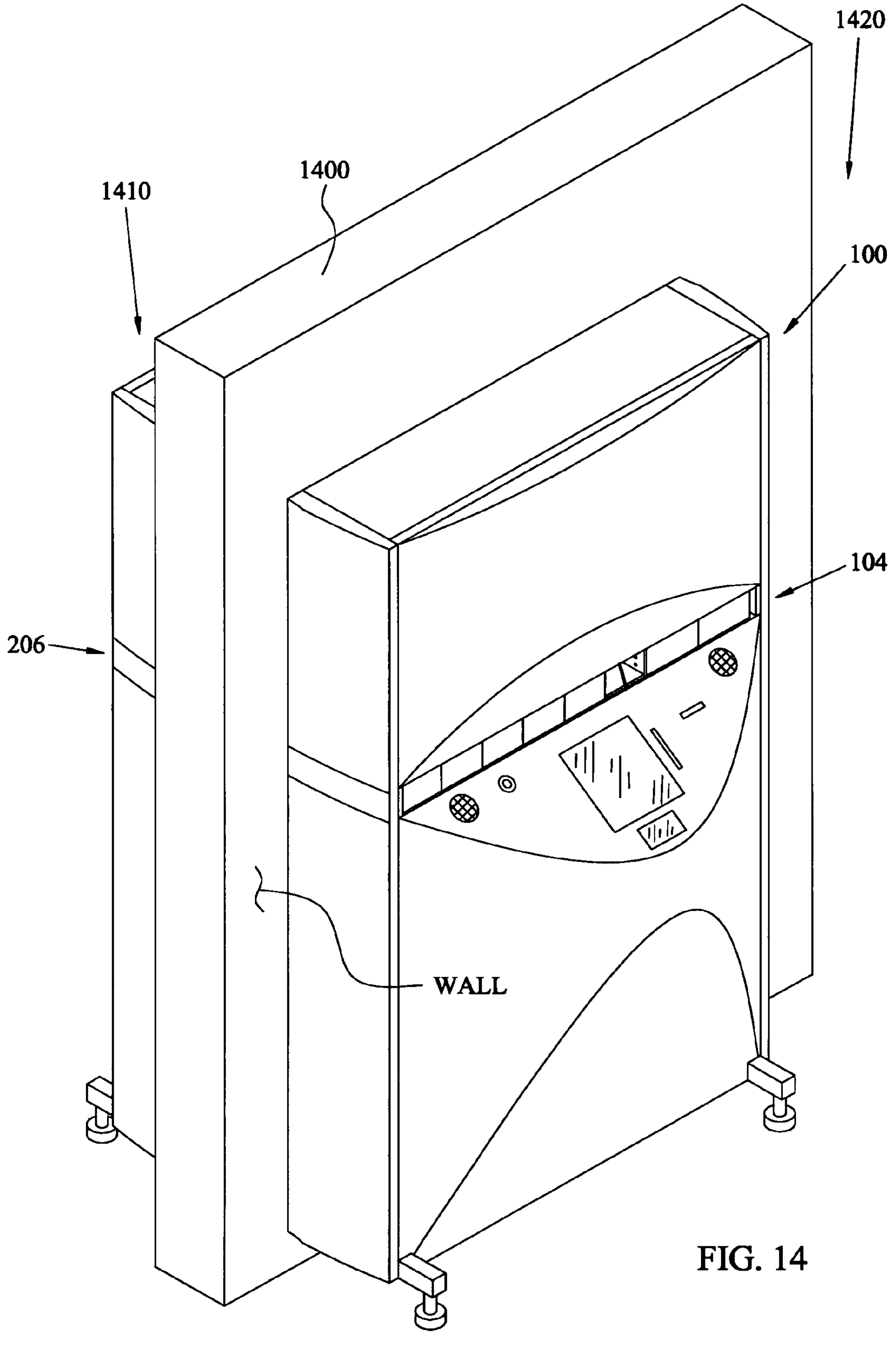
FIG. 14 is a side perspective view of a dispensing apparatus installed in a location for serving users.

FIG. 14 shows one deployment scenario for the dispensing apparatus which is particularly useful for the secure dispensing uses described above. In this case, the dispensing apparatus is positioned in a wall represented by the wall portion 1400 which separates a secure space 1410 from a public space 1420. The dispensing apparatus is positioned in the wall such that the dispensing station 104 is disposed in the public space 1420 while the loading station 206 is disposed in the secure space 1410. In this configuration, the dispensing apparatus makes a user terminal and dispensing station available to the public, while maintaining a secure environment around the back of the dispensing apparatus 100. This configuration also disposes an administrative terminal, a loading station, and other loading mechanisms (none seen) in the secure space to which access may be limited to authorized administrative personnel.

Perpetual Inventory

Figure 15:
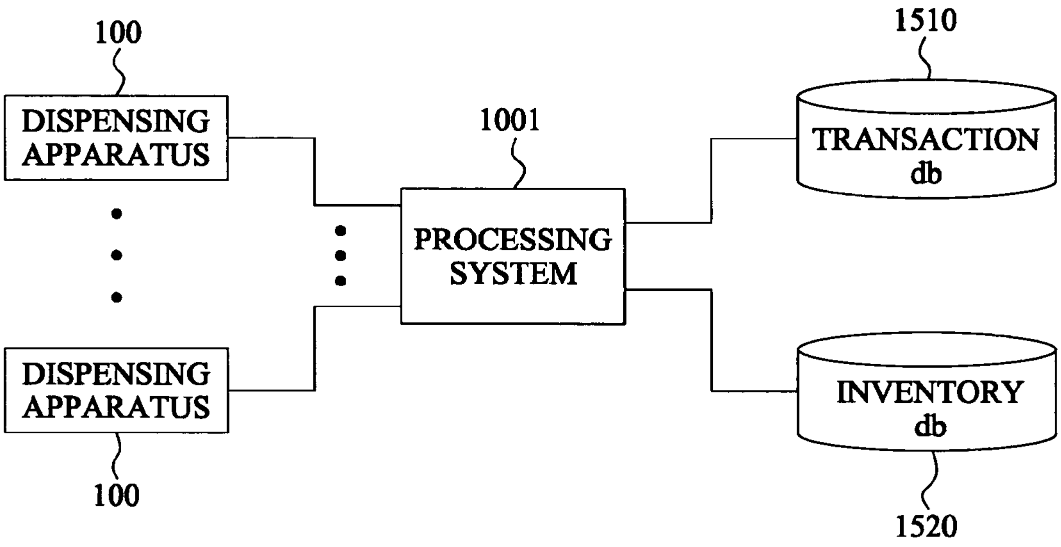
FIG. 15 is a diagram of a dispensing system configured for perpetual inventory.

The combination of a dispensing apparatus with individually-monitored bins and a processing system with manifold functionality supports the execution of a perpetual inventory protocol. Perpetual inventory is a form of stock control in which running records are kept of all load and dispense operations continuously or within specified time periods. FIG. 15 illustrates a system configuration in which one or more dispensing apparatus 100 are connected to a processing system 1001. A unified transaction database 1510 is maintained and managed by the processing system 1001. The transaction database contains relational data structures for each dispensing apparatus 100, or, alternatively, a unified data structure for one or more dispensing apparatus. A unified inventory database 1520 contains relational inventory data structures for recording inventory data respecting products dispensed from the apparatus 100. A perpetual inventory is enabled by the fact that every time bins are moved in a dispensing apparatus, the information sensors at the dispensing and loading stations can read or sense the transaction information on products or packages in the bins that pass by, as well as the Empty status of bins with no contents. Thus, when a load operation is conducted, the transaction information of products or packages being loaded can be parsed for inventory information. Similarly, when a chain is being moved to place a bin at the dispensing location, each bin row that passes the dispensing and loading stations can be sensed for transaction information on bin contents and bin status and the information can be parsed for inventory information. Similarly, a chain can be moved periodically simply to obtain inventory information. Inventory information obtained from chain movement can be processed by the processing system and aggregated in the inventory database. A method of maintaining a perpetual inventory using the system of FIG. 15, would include moving a chain of bins with products past a dispensing or loading station, sensing transaction information on contents of the bins at the dispensing or loading station, obtaining inventory information from the transaction information, and storing the inventory information in the inventory database 1520.

Additional Dispensing Apparatus Embodiment

With the foregoing in mind, another dispensing apparatus embodiment is described in which the orientation of the package 650 is reversed from that illustrated and described above. In this case, it might be convenient to provide access to a package at a dispensing location with the thin end of the package on the lower surface of the bin that contains it, thereby making the edge of the package visible with a downward glance by a person looking down into the bin. In this embodiment, the orientations of the bins, the sensors, the doors, and the door motors all have to be reversed. This additional embodiment is illustrated in FIGS. 16-22.

Figure 16:
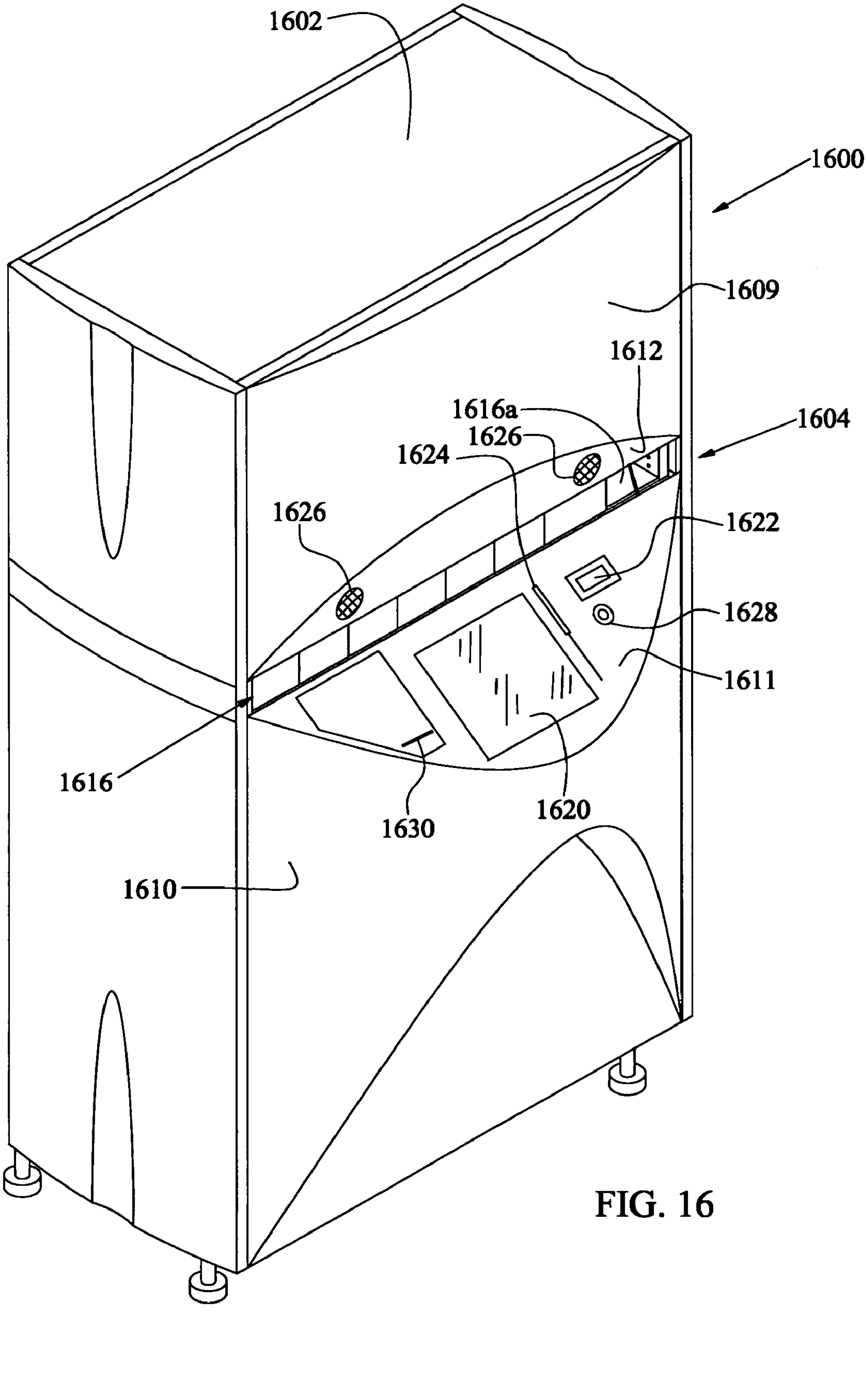
FIG. 16 is a front perspective view of another dispensing apparatus.

FIGS. 16 and 17 show a dispensing apparatus 1600 having a housing 1602, preferably although not necessarily, a six-sided one, made of sheet metal panels joined to each other and supported on a frame. The housing 1602 is constructed so that the interior of the apparatus 1600 is normally accessed by a user or consumer through a dispensing station 1604 on the housing, and by authorized administrative personnel through a loading station. Although FIG. 17 shows a loading station 1706 on a side of the housing 1602 opposite that where the dispensing station 1604 is found, it is possible for the stations to be located on the same side of the housing, or even to share the same station location. Nevertheless, for the sake of illustration only, the stations 1604 and 1706 are shown at separate, oppositely situated locations.

The dispensing station 1604 is positioned between a first shaped panel 1609 and a second shaped panel 1610. The first shaped panel 1609 has a surface 1612 bordering the dispensing station and the second shaped panel has a surface 1611 bordering the dispensing station. The dispensing station 1604 may be constituted of an array 1616 of locked or closed doors. The array 1616 of doors may have one or more doors in it; the array is illustrated with eight doors, for example. The door 1616*a* is shown opened for access. When a door at the dispensing station is opened to provide access to a product or package in a bin, the apparatus is said to "dispense" the product or package when the product or package is retrieved by or for a recipient.

The surfaces 1611 and 1612 on the front of the housing 1602 together constitute a control panel which borders the dispensing station 1604. The control panel provides access to interface instruments for conducting a transaction. These instruments may include, for example, a touch screen panel 1620, a signature pad 1622, a magnetic stripe (card) reader 1624, speakers 1626, a camera 1628, and a receipt slot 1630. The control panel may provide access to fewer or more instruments than those shown.

In the dispensing apparatus example shown in the figures, which represents the case where the stations 1604 and 1706 are on opposite sides of the apparatus 1600, the loading station 1706 is constituted of a first raised cover 1710, a second raised cover 1712 disposed beneath the cover 1710, and an array 1716 of locked or closed doors situated between the covers 1710 and 1712. One door 1716*a* is shown open at the loading station. As seen in FIG. 17, the dispensing apparatus 1600 also includes, on the rear of the housing 1602, an administrative terminal 1720 which provides certain authorized administrative personnel access to interface instruments for conducting administrative tasks such as loading and/or unloading the dispensing apparatus 1600 or initiating an inventory procedure. These instruments may include, for example, a touch screen panel 1721 and a keypad 1722. Other instruments such as a magnetic stripe (card) reader, speakers, a camera, and a printer slot also may be provided.

Figure 18:
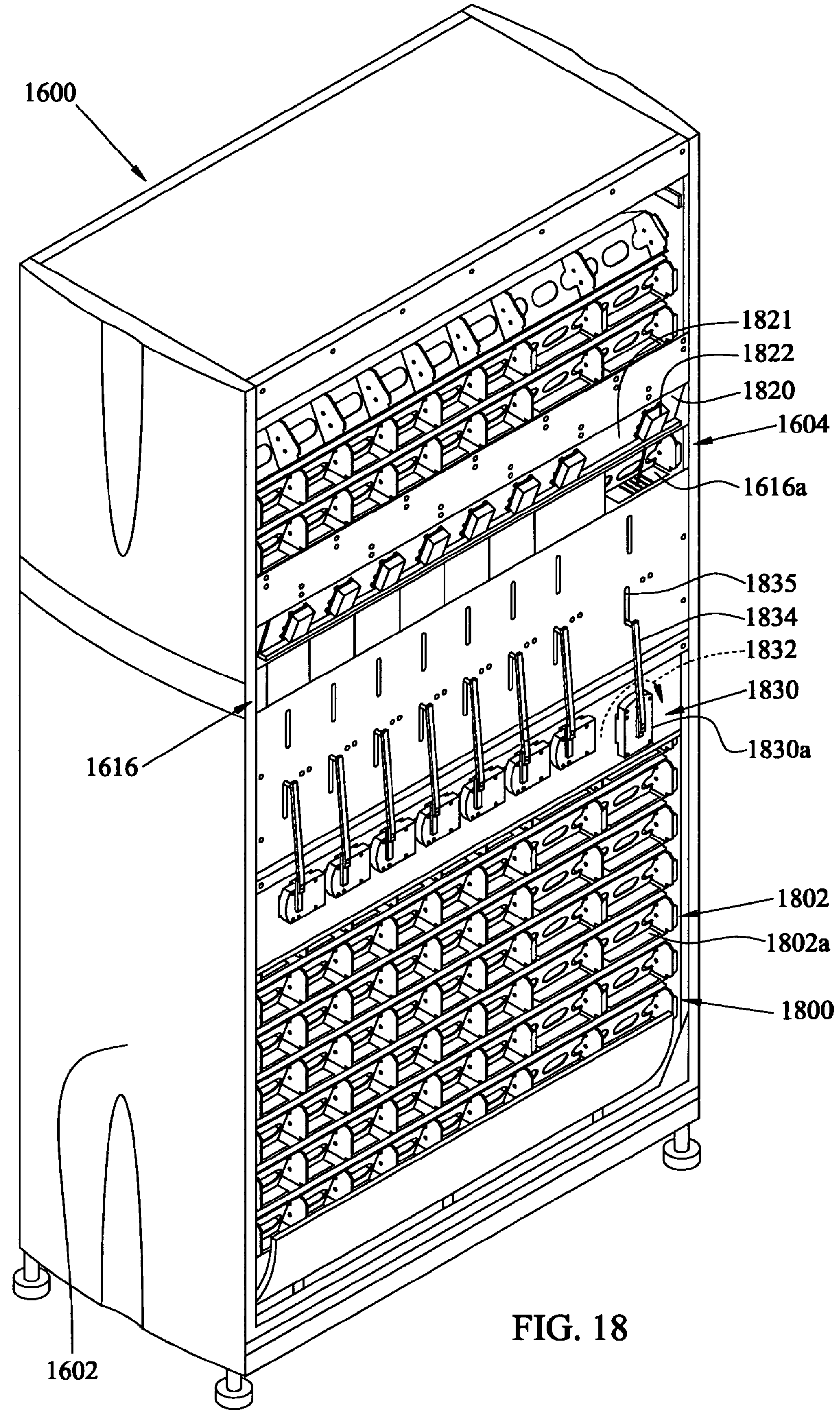
FIG. 18 is a front perspective view of the dispensing apparatus of FIG. 16, with a front cover removed to show details of a chain of bins and a dispensing station.
Figure 19:
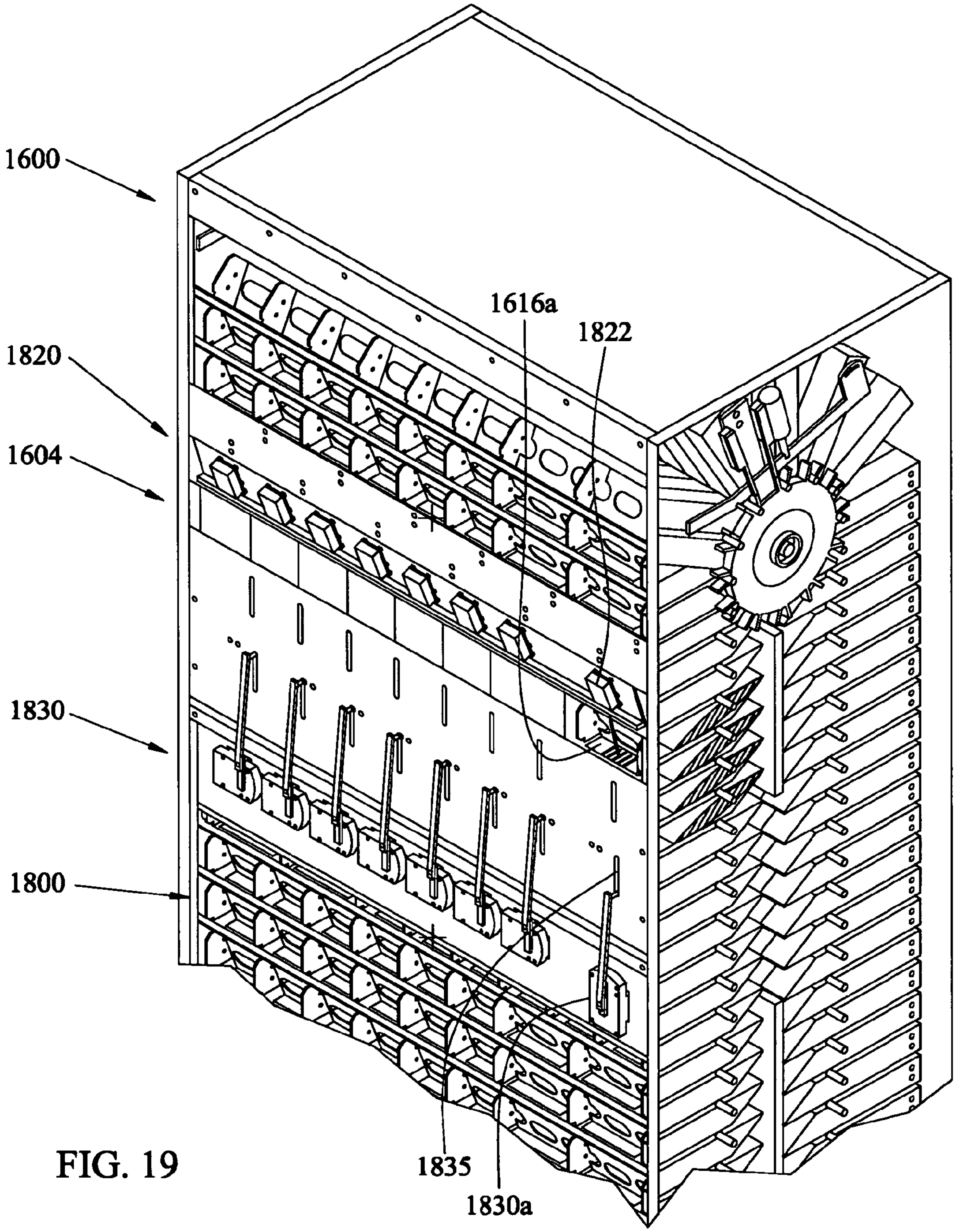
FIG. 19 is a perspective view toward a side of the dispensing apparatus of FIG. 1, with front and side covers removed to show further details of the chain of bins and dispensing station.

In FIGS. 18 and 19 panels of the housing 1602 are removed to illustrate a mechanism constituted of a two-dimensional array of moveable bins. For example, the bins may be linked or connected to form a chain 1800 that may be moved or transposed in either vertical direction. In this example, the ends of the chain 1800 are linked together to form a continuous endless chain of bins. Alternatively, at least one link may be omitted, making the chain discontinuous. The bins are provided in a sequence of 1×n arrays each of which forms a row of the chain 1800; one row is indicated by reference numeral 1802, and one bin in the row 1802 is indicated by reference numeral 1802*a*. Each row may comprehend one or more bins. The chain 1800 of bins is moved, retained and positioned in the apparatus 1600 by mechanisms in the housing 1602 corresponding to or identical with those illustrated above in FIGS. 4 and 5.

Figure 20:
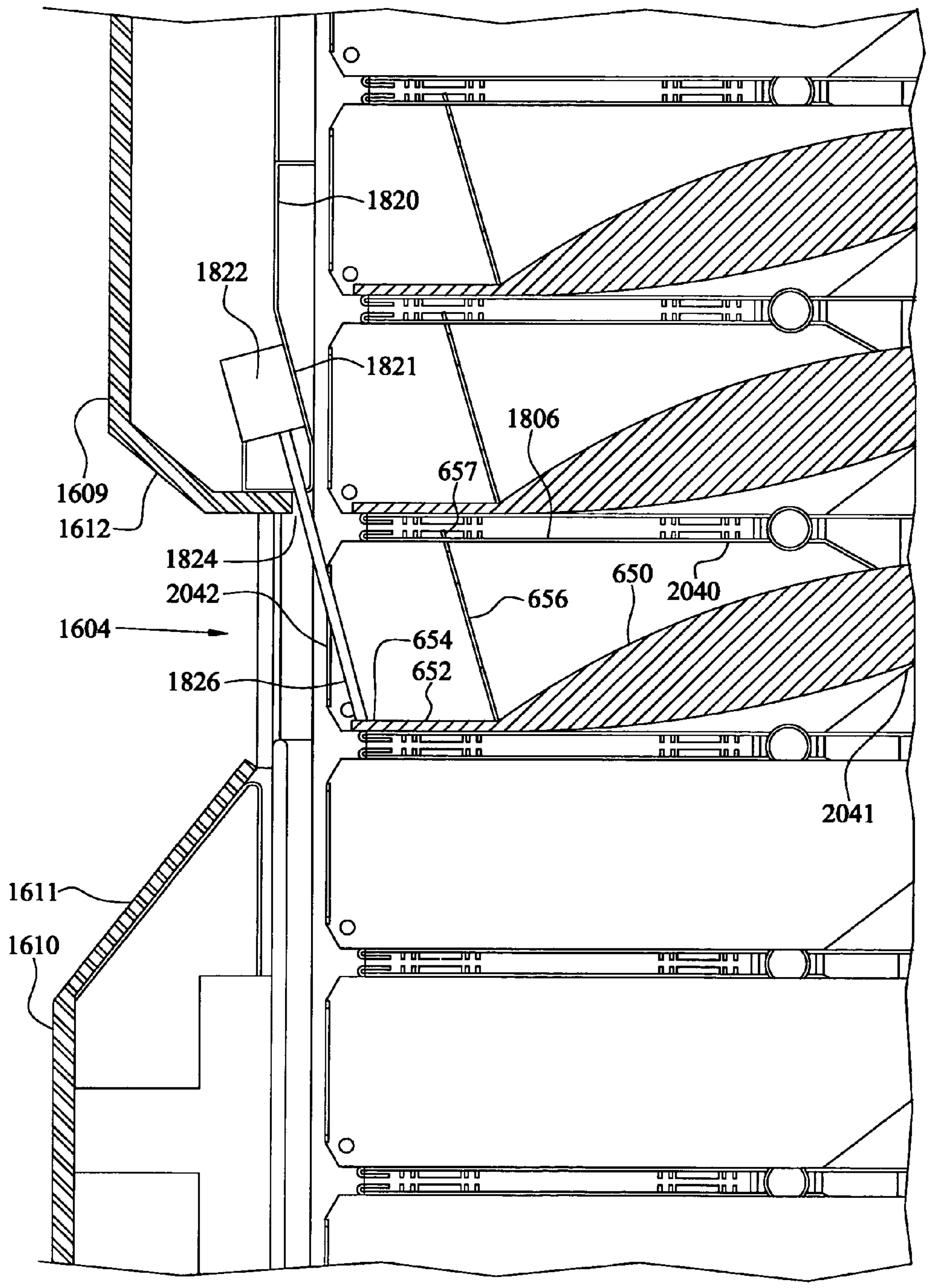
FIG. 20 is an enlarged, partially schematic side view that shows the structure and operation of the dispensing station.

FIGS. 18, 19 and 20 illustrate elements of the dispensing station 1604 that are not visible in FIG. 16. A panel 1820 is secured to the frame of the housing 1602 between the shaped panel 1609 and the interior of the housing 1602. The panel 1820 extends across the width of the housing 1602 above and adjacent the dispensing station 1604. As best seen in FIG. 20, the panel 1820 has a portion 1821 that slopes inwardly of the housing 1602, toward the chain 1800. An array of information sensors is supported on the panel portion 1821 to sense or read information in the bins. One of the sensors is indicated by reference numeral 1822. Preferably, the sensors are optical sensors such as bar code readers. Each sensor is given a line of sight into a respective bin by a through an aperture formed by a gap between the lower edge of the panel portion 1821 and the lower edge of the shaped panel 1609. The aperture for the sensor 1822 is indicated in FIG. 20 by reference numeral 1824, and the sensor's line of sight is indicated by 1826. The aperture 1824 enables the sensor 1822 to read along the line of sight 1826 without regard to the position of a door at the dispensing station. That is to say, the sensor 1822 is able to sense the contents of a bin at the dispensing station when the door associated with the sensor 1822 is open and when it is closed.

The doors 1616 cover a bin row at the dispensing station, each door covering a respective, individually-accessible bin. The doors may be unlocked or unsecured and opened by means of handles if dispensation of the products is not subject to security constraints. In other cases, security constraints may require locking of the doors while the constraints are satisfied. For dispensing constrained by security, the doors 1616 are individually controlled by motors 1830, with each motor coupled to open and close a door by a rotatable linkage. For example, the motor 1830*a* has a member that it rotates as indicated at 1832. The member is linked by a rotatable joint to an elongate arm 1834. The arm 1834 is, in turn, linked to the door 1616*a* on a trunnion that rides up and down in the slot 1835. The motor 1830*a* operates in response to a command, rotating its member in the direction 1832, which draws the arm 1834 downwardly to the position shown in FIG. 18. The arm's downward motion draws the door 1616*a* down, exposing the opening to the bin behind the door 1616*a* and providing access to its contents. Another command reverses the sequence, moving the door 1616*a* up and closing the opening to the bin. With the door closed, the motor 1830*a* is maintained in a locked position which prevents the door 1616*a* from being opened manually. Each of the doors at the dispensing station works in this way.

FIG. 20 illustrates elements of the exemplary dispensing station described above with respect to FIGS. 18 and 19. In this figure, a bin 1806 is positioned at a closed dispensing station door 1616*b*. The bin 1806 is representative of all bins in the chain 1800. The bin 1806 is an elongated box 2040 having a closed tapered end 2041 and a rectangular open end 2042. When a bin is positioned at a door, its open end faces the door. Each bin may contain a product or package retained at an information sensing location in the bin. For example, the bin 1806 has disposed in it the package 650 shown in FIG. 7 with a thin end 652 on which transaction information 654 is printed or affixed or positioned. For example, the transaction information may be in the form of an optically-discernable bar code. The thin end 652 is urged to a predetermined information-reading position against a lower side of the elongated box 2040 near its open end to retain the thin end 652 where the transaction information be sensed or read. When the bin 1806 is at the dispensing station, the predetermined information-reading position is in the line of sight 1826 of the sensor 1822 adjacent the door 1616*b*. In the example shown in these figures, the retainer 656 integral with the package 650 retains the package 650. Preferably, the package 650 is flexible, made of plastic film or reinforced paper, and the retainer 656 is semi-rigid, made of cardboard or thin plastic, so that it will buckle, flex, or bend. The retainer 656 has holes formed in it for easy insertion into and removal from a bin. The retainer 656 acts between a side of a bin and the thin end 652 such that the transaction information 654 is positioned in the line of sight 1826 of the sensor 1822. The sensor 1822 is thus enabled to read the transaction information on a product or package in the bin 1806 or, if the bin is empty, status information on the side of the bin in the line of sight 1826. Such information may signify that the bin is empty.

A loading station for the dispensing apparatus may be separate from the dispensing station just described and located on an opposite side of the housing, as shown in FIGS. 16 and 17. In this case, the loading station is constituted of the same elements as the dispensing station, in an inverted relationship, because the endless chain configuration inverts the bins at the loading station (with respect to the bins at the dispensing station) and requires inversion of the information sensors at the loading station, with respect to the orientation of the information sensors at the dispensing station. That is not meant to so limit the application of the principles of the dispensing apparatus, and the dispensing and loading stations may be located on the same panel of the housing, in which case they would be identically configured and oriented. Or, the same station could be used to load and dispense products or packages.

FIG. 20 provides an example of a product intended to be dispensed from a dispensing apparatus such as the dispensing apparatus 1600. The product is contained in the package 650 with a transaction information location on the thin end 652 where transaction information 654 is received. This is not meant to limit the application of these principles. The product in the bins may or may not be packaged. Alternatively, or in addition, the bins may be lined with coverings to protect their inner surfaces. Preferably the lining would be removable and extracted when the product or package is taken from a bin. The transaction information location may be on the product or a package or envelope containing it. In the case illustrated in FIG. 7, a label receives and retains transaction information related to the product. Thus, with reference to FIGS. 20 and 7, the package 650 is received or loaded in the bin 1806 such that the label is situated at or near an information-reading position in the bin 1806 where it can be read by the sensor 1822 at the dispensing station 1604 and by its counterpart at the loading station 1706. The transaction information on a product or package may include, for example, an identification of the product, a price, an inventory number, and so on; it may also contain the identification of a recipient who has paid for the product, or who is authorized or required to receive it. The transaction information on the label and the bin status information may be coded in some standard format, and must be discernible by the information sensors at the dispensing and loading stations. For example, the transaction information and the bin status information may be on a label in the form of a bar code, on a device bearing an RF code, on an identification tag, or any equivalent. Further, the label may be written to as well as read from in situ. The product, package, or envelope is loaded into a bin such that the transaction information may be sensed (or not) at both the loading and the dispensing stations.

Figure 21:
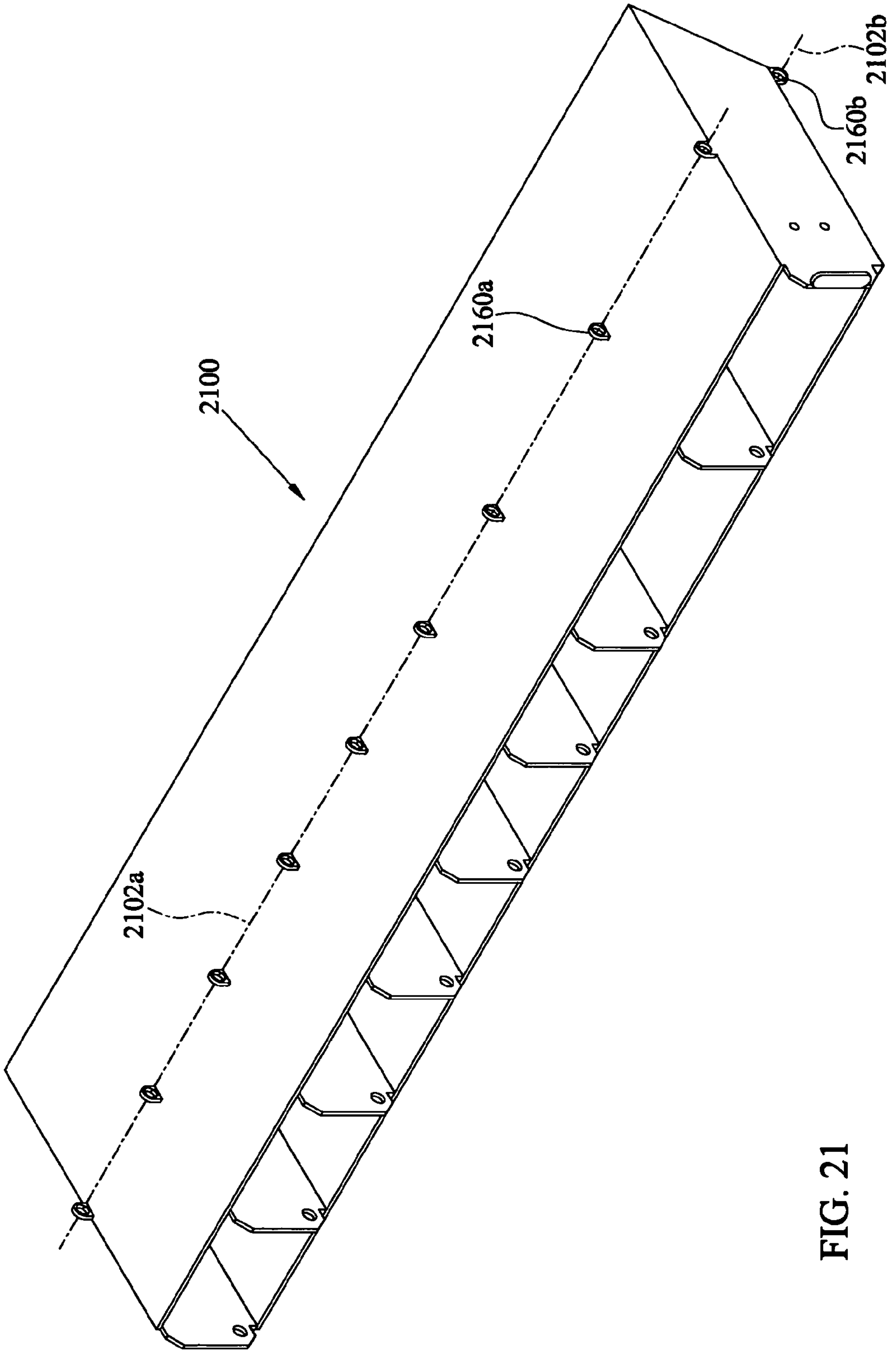
FIG. 21 is a side perspective view of a row of bins in a chain of bins.
Figure 22:
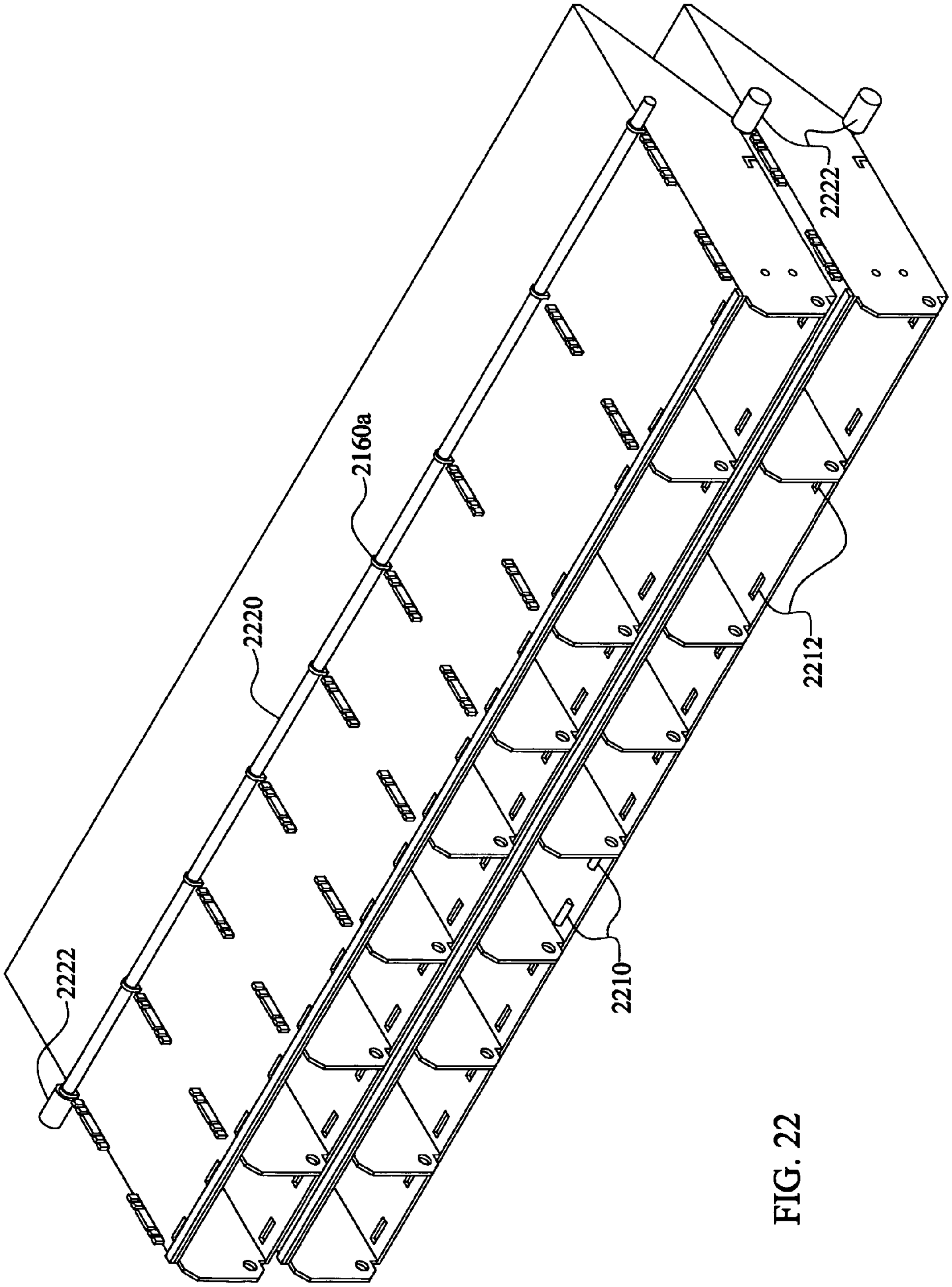
FIG. 22 is a side perspective view of a portion of the chain of bins.

The plurality of bins in the dispensing apparatus is assembled first into a plurality of bin rows, such as the bin row 2100 shown in FIG. 21, and then into a array of bins such as the chain 1800 shown in FIGS. 18 and 19. Each bin row is preferably, although not necessarily, one-dimensional and may contain one or more bins of the same or different widths. The bin rows may be made of sheet metal or molded plastic. As seen in FIGS. 21 and 22, each side of a bin row has a plurality of coupling eyelets 2160*a* and 2160*b* disposed in two elongate alignments in alignment with the edge where the bins transition to their closed, tapered ends in the row. The coupling eyelets on one side of a bin row are aligned with a coupling eyelet alignment on an adjacent bin row and joined by a rod (not shown) so that the bin rows are linked to form a chain of bin rows. For example, the bin row of FIG. 21 is linked to one adjacent bin row by a rod (not shown) along the axis 2102*a*, and to another adjacent bin row by another rod (not shown) along the axis 2102*b*. The tapered ends of the bins permit those ends to be moved together and apart as the chain 1800 travels around the axles at each end of the housing; see FIG. 19, for example.

FIG. 22 shows two bin rows assembled as described into a chain portion. One rod 2220 is shown received in eyelets 2160*a* on one side of a bin. The rods are retained in the eyelets by cylindrical retainers 2222 secured to the ends of the rods; one such retainer is shown on one end of the rod 2220. These are the elements of the chain 1800 that are engaged by a sprocketed drive mechanism such as is shown in FIGS. 3 and 4. Also visible in FIG. 22 are two modes of retaining packages such as the package 650 in the bins. As seen in FIG. 7, the semi-rigid retainer 656 has two spaced-apart tabs 657 on its lower edge. These tabs may engage bumps 2210 or slots 2212 formed on or in a surface of each bin.

Batch Loading

In the dispensing apparatus described thus far, a loading station serving a single row of bins is described. This is not meant to limit the principles of dispensing apparatus construction, system architecture or loading. It should be evident that a mechanism for accessing more than one row of bins for loading may be provided. Therefore, in yet other aspects of the dispensing apparatus 100/1600 and in view of the BATCH LOAD procedure described above, batch loading may be implemented by a door on either side of the dispensing apparatus that, when open, provides access to more than one row of bins at once. With reference to FIGS. 17 and 23, for example, a panel or door 2300 may be provided on the rear of the dispensing apparatuses 100 and 1600 illustrated in FIGS. 2 and 17. The door 2300 spans a plurality of bin rows. For example, as shown in FIG. 23, the opening provided by the door 2300 spans fourteen bin rows. The door 2300 may be secured or locked in a manner to permit only authorized administrative personnel or system programming to unlock and open it. With the door 2300 unlocked and opened, a pharmacist for example would be able to quickly fill bins with packages or containers bearing transaction information without having to step one row of bins at a time past the loading station. Upon command, rows of loaded bins would be moved past a sensor location such as the loading station or the dispensing station in a continuous movement during which the transaction information would be read and entered into the bin data structure 1012. A dispensing apparatus with such a door and a loading station would afford the option of loading one or a few bins at a time by way of the loading station, or batch loading many bins quickly by way of a door. Alternately, the loading station may be eliminated altogether and the bins may be filled solely by loading through a door such as the door 2300. In this case the dispensing station sensors would be utilized for load sensing as well as for sensing for dispensing. Additionally, an administrative terminal such as the administrative terminal 1720 may be disposed on the same side of the dispensing apparatus housing as a door such as the door 2300. It is the rear side of the dispensing apparatus 100, 1600, with one or more loading mechanisms, and an administrative terminal that may be disposed in the secure space 1410 of FIG. 14.

Two-Dimensional Array of Bins

Figure 24C:
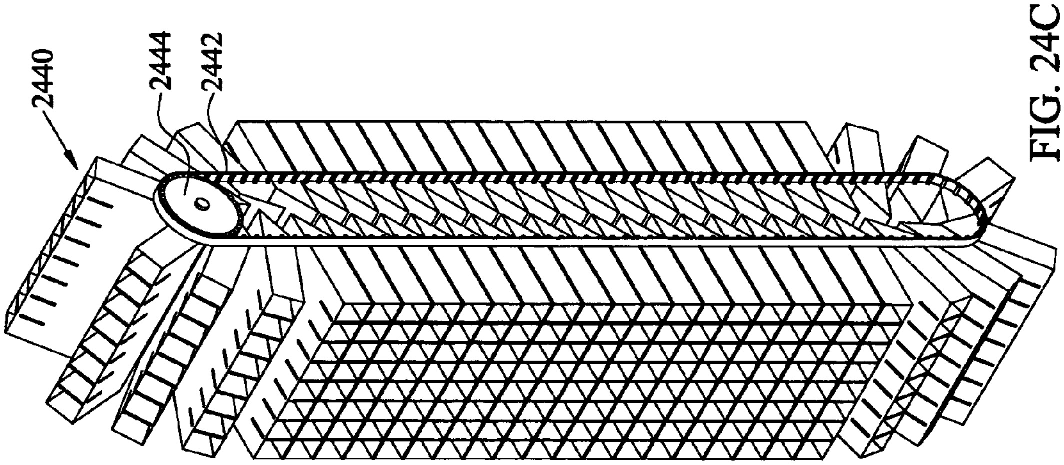
FIGS. 24A-24C are side perspective views of various embodiments of a chain of bins.
Figure 24B:
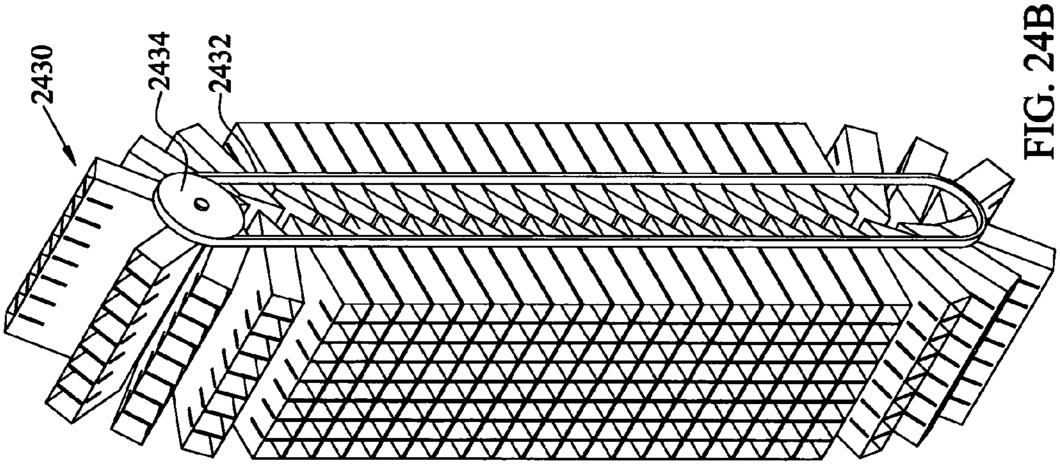
Figure 24A:
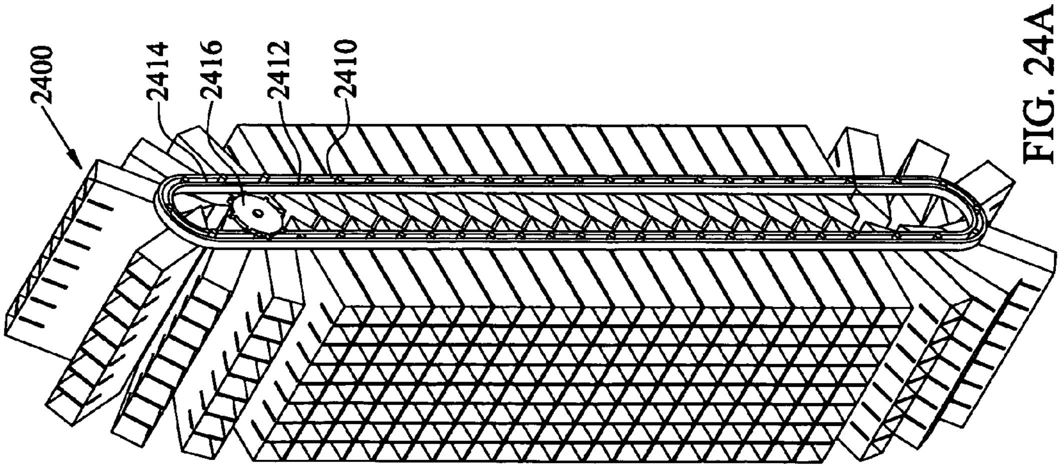

The endless chains 300 and 1800 are illustrative of a two-dimensional matrix or array of moveable bins which can be operated in response to control information synthesized from transaction information on the products in the bins and a dispense request to place a bin at a dispensing station on a dispensing apparatus. These illustrations are not meant to be limiting. Other chain configurations may be employed in the dispensing apparatuses described above. Three possible alternatives are illustrated in FIGS. 24A-24C. In FIG. 24A, a chain 2400 is shown. Inner and outer tracks 2410 and 2412 are mounted on a side panel of an apparatus housing to form a bin guide 2414 therebetween. The cylindrical retainers mounted to the ends of the rods that hold the bin rows together in the chain 2400 are received in the bin guide 2414 and driven therein by an offset drive sprocket 2416 which may be journeled to the same panel as the inner and outer tracks 2410 and 2412 and connected to a drive motor by conventional means (not shown) for moving the chain 2400 in response to control information as described above. In FIG. 24B, a chain 2430 is assembled from rows of bins which are connected together by a flexible cable 2432 attached to the same side of each bin row. The chain 2430 is driven by a drive wheel 2434 connected to a drive motor by conventional means (not shown) for moving the chain 2430 in response to control information as described above. In FIG. 24C, a chain 2440 is assembled from rows of bins which are connected together by a flexible belt 2442 notched on its inside edge and attached to the same side of each bin row. The chain 2440 is driven by a drive wheel 2444 connected to a drive motor by conventional means (not shown) for moving the chain 2440 in response to control information as described above.

A two-dimensional array of moveable bins which can be disposed in a dispensing apparatus and operated in response to control information synthesized from transaction information on the products in the bins and a dispense request to place a bin at a dispensing station may be realized in arrangements other than chains. Two such arrangements are shown schematically in FIGS. 25 and 26.

Figure 25:
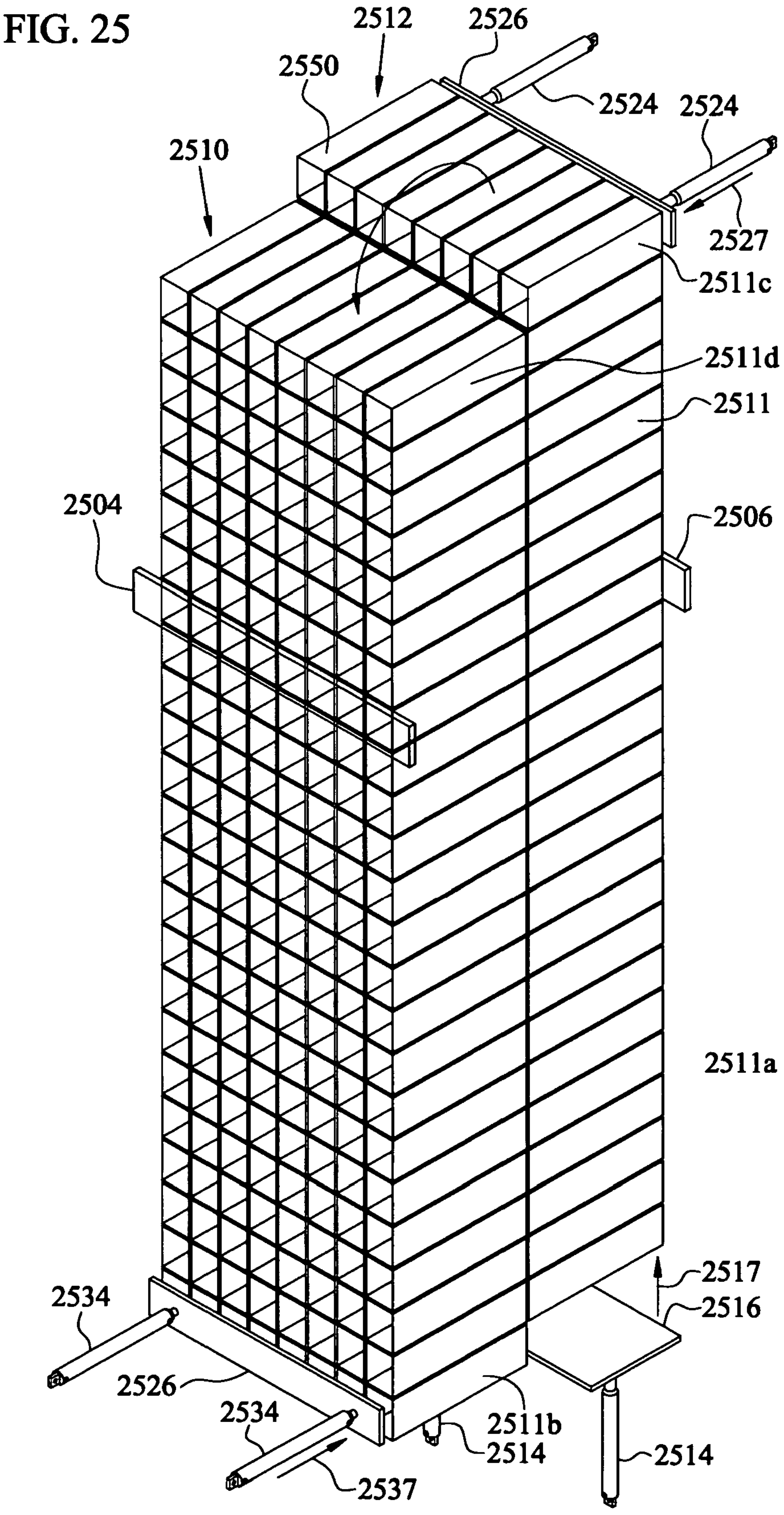
FIG. 25 is a partially schematic side perspective view of a two-dimensional array of moveable bins.

In FIG. 25, a dispensing station on a dispensing apparatus (not shown) is denoted by reference numeral 2504 and a loading station by reference numeral 2506. Again, the dispensing and loading stations are shown separate, but may be at the same location. Two adjacent stacks 2510 and 2512 of bin rows 2511 are disposed in a housing of the dispensing apparatus and held therein in close abutting relationship by a frame (not shown). Each bin row is a 1×n array of bins. Each bin is an elongate quadrilateral tube open at both ends so that each bin may be loaded or may dispense through either end. The bottom bin row 2511*a* of the stack 2512 is retained against downward movement by a latch mechanism (not shown). The bottom bin row 2511*b* of the stack 2510 is retained against downward movement by a plate or panel (not shown). The stacks 2510 and 2512 are offset vertically by the height of at least one bin row so that the bottom of the stack 2510 is positioned at a level equal to the height of one bin row beneath the bottom of the stack 2512, and the top of the stack 2510 is positioned at a level equal to the height of one bin row beneath the top of the stack 2512. A pair of solenoids 2514 is connected to move a plate 2516 against and away from the bottom of the bin row at the bottom of the stack 2512. A pair of solenoids 2524 is connected to move a plate 2526 against and away from the outward side of the bin row at the top of the stack 2512. A pair of solenoids 2534 is connected to move a plate 2536 against and away from the outward side of the bin row at the bottom of the stack 2510. The stacks 2510 and 2512 may be moved in synchronism by the solenoids and plates as follows. First, the topmost bin row 2511*c* in the stack 2512 is moved by the pair of solenoids 2524 and plate 2526 in the direction of the arrow 2527 to the top of the stack 2510. The pair of solenoids 2524 retracts, withdrawing the plate 2526 from the top of the stack 2510. Next, the bottommost bin row 2511*b* is moved by the pair of solenoids 2534 and plate 2536 in the direction of the arrow 2537 beneath the bottom of the stack 2512, onto the plate 2516. The pair of solenoids 2534 retracts, withdrawing the plate 2536 from the bottom of the stack 2510. This permits the stack 2510 to move downwardly by a distance equal to the height of a bin row. Then, the bottommost bin row 2511*b* is moved by the pair of solenoids 2514 and plate 2516 in the direction of the arrow 2517 through the latch mechanism (which is not shown), raising the stack 2512 by the height of one bin row to the position with respect to the stack 2510 that is seen in FIG. 25. The pair of solenoids 2514 retracts, withdrawing the plate 2516 from the bottom of the stack 2512 and leaving the bin row 2511*b* on the bottom of the stack 2512. With control of the solenoids as described above, the stacks 2510 and 2512 may be driven as shown by the arrow 2550 in response to control information synthesized from transaction information on the products in the bins and a dispense request to place a bin at a dispensing station on the dispensing apparatus.

Figure 26:
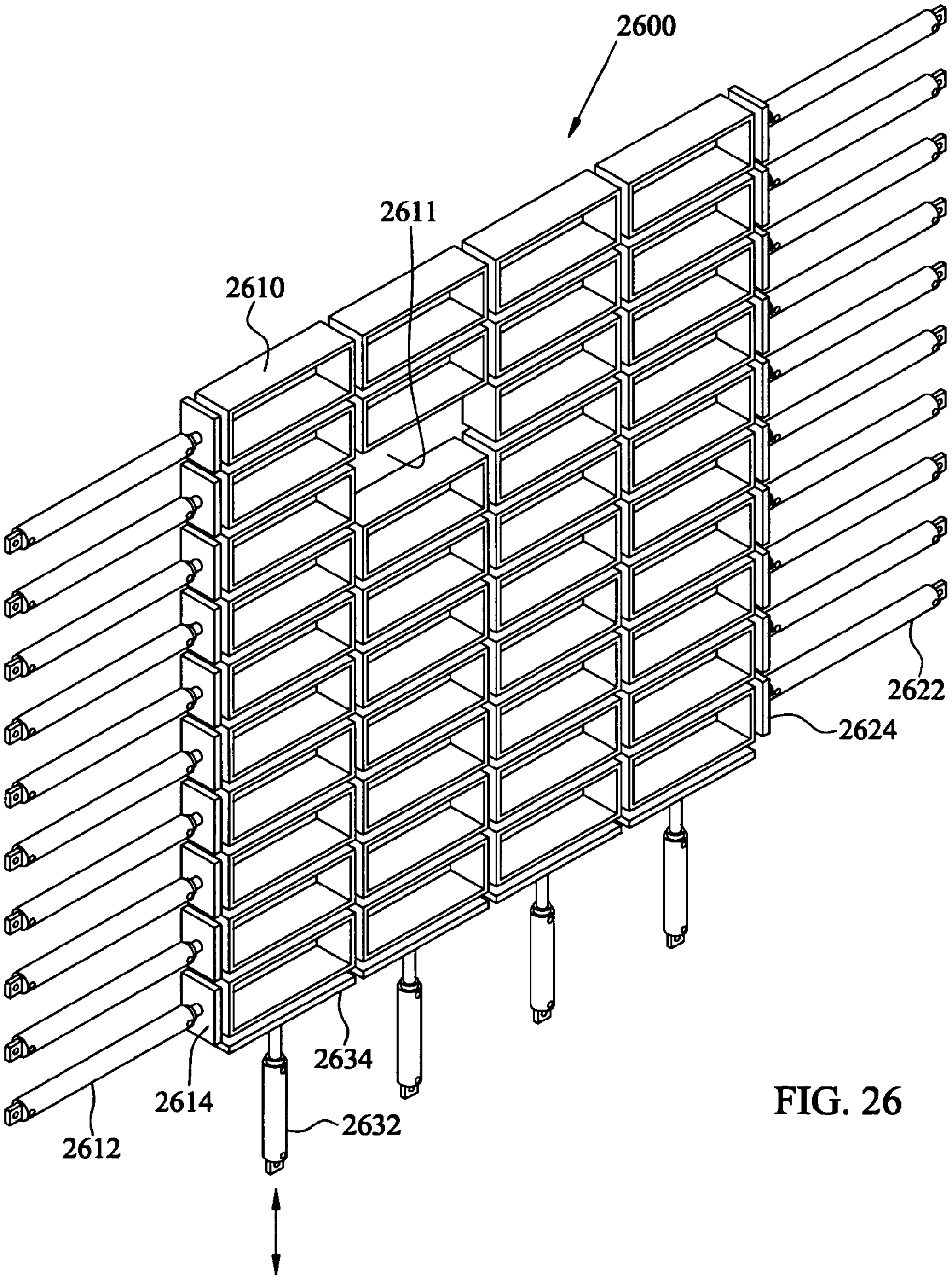
FIG. 26 is a partially schematic side perspective view of another two-dimensional array of moveable bins.

In FIG. 26, a two-dimensional array 2600 constituted of a plurality of individual bins 2610 is disposed in a housing of the dispensing apparatus and held therein in close abutting relationship by a frame (not shown). The bins form a two-dimensional m×n matrix of (m×n)−1 bins in which one matrix location 2611 is empty. Each bin is an elongate quadrilateral tube open at opposing sides so that each bin may be loaded or may dispense through either opposing side. Along one side of the matrix is an array of solenoids 2612, each connected to move a plate 2614 in a substantially horizontal direction toward and away from a respective row of the matrix. Along the opposing side of the matrix is an array of solenoids 2622, each connected to move a plate 2624 in a substantially horizontal direction toward and away from a respective row of the matrix. Along the bottom edge of the matrix is an array of solenoids 2632, each connected to move a plate 2634 in a substantially vertical direction toward and away from a respective column of the matrix. With control of the individual solenoids 2612, 2622, and 2632, the rows and columns of the matrix may be driven in response to control information synthesized from transaction information on products in the bins and a dispense request to place a bin at a dispensing or loading station anywhere in the matrix.

Although a novel apparatus, system and method for securely dispensing products have been described with reference to illustrations, examples and embodiments, it should be understood that various modifications can be made without departing from the spirit of the principles embodied in these illustrations and examples. Accordingly, the scope of those principles is limited only by the following claims.

The invention claimed is:

1. A dispensing apparatus, comprising:

a housing;

a two-dimensional array of bins in the housing;

a dispensing station on the housing;

a plurality of sensor means near the two-dimensional array of bins for sensing transaction information on products in the bins, the transaction information identifying a recipient of the product;

a controller means connected to the plurality of sensor means for maintaining a bin data structure relating transaction information sensed on products in the bins to locations of the bins in the two-dimensional array of bins;

an entry device for generating a dispense request;

the controller means further for producing control information indicative of a bin in the two-dimensional array in response to the dispense request and transaction information in the bin data structure;

a mechanism in the housing coupled to the two-dimensional array of bins for moving the bins to place the bin at the dispensing station in response to the control information;

and, a door mechanism at the dispensing station for providing access to the bin in response to the control information.

2. The dispensing apparatus of claim 1, wherein the two-dimensional array of bins is a chain having a substantially longitudinal direction of movement and including a series of bin rows, each bin row including one or more bins disposed transversely to the direction of movement.

3. The dispensing apparatus of claim 2, each bin in a bin row including an elongated box having an open front portion and a tapered back portion.

4. The dispensing apparatus of claim 3, further in combination with a package for containing a product to be dispensed, the package including a mark with transaction information and a retainer for retaining the package at a location where the mark can be sensed.

5. The dispensing apparatus of claim 1, the plurality of sensor means including information sensors positioned near the dispensing station for sensing transaction information from products in bins at the dispensing station.

6. The dispensing apparatus of claim 5, the information sensors having lines of sight into bins at the dispensing location to provide transaction information from products in bins at the dispensing station to the controller means.

7. The dispensing apparatus of claim 6, wherein the two-dimensional array of bins is an endless chain having a substantially longitudinal direction of movement and including a series of bin rows, each bin row including one or more bins disposed transversely to the direction of movement.

8. The dispensing apparatus of claim 7, each bin in a bin row including an elongated box having an open front portion, a tapered back portion, and a retainer means acting against a side of the box for retaining a package containing a product at a location against the side of the box where transaction information can be sensed.

9. The dispensing apparatus of claim 1, wherein the mechanism for moving the two-dimensional array of bins is a rotation mechanism.

10. An apparatus for securely dispensing products, comprising:

a housing;

a two-dimensional array of bins in the housing;

a loading station on the housing for loading the bins with packages labeled with transaction information;

a dispensing station separate from the loading station on the housing;

a device for providing a dispense request including information identifying a recipient;

an information sensor mechanism near the loading station for sensing transaction information from products in the bins, the transaction information identifying a recipient of the product;

a controller means coupled to the device and the sensor mechanism for producing control information denoting a bin location in response to the identification information and to the transaction information;

a mechanism coupled to move the bins so as to move a bin at the bin location to the dispensing station in response to the control information; and a door mechanism at the dispensing station for providing access to the bin in response to the control information.

11. The dispensing apparatus of claim 10, wherein the two-dimensional array of bins is an endless chain having a longitudinal direction of motion and including a series of bin rows, each bin row including one or more bins disposed transversely to the direction of motion.

12. The dispensing apparatus of claim 11, each bin in a bin row including an elongated box having an open front portion.

13. The dispensing apparatus of claim 12, in combination with a package for containing products to be dispensed, the package including a mark with transaction information and retainer for acting to retain the mark with in a predetermined position in the box where the transaction information can be sensed.

14. The dispensing apparatus of claim 10, further including an information sensor mechanism near the dispensing station and coupled to provide transaction information from products in bins at the dispensing station to the controller means.

15. The dispensing apparatus of claim 14, wherein the two-dimensional array of bins is a series of bin rows having a substantially longitudinal direction of motion, each bin row including one or more bins disposed transversely to the direction of motion.

16. The dispensing apparatus of claim 15, each bin in a bin row including an elongated box having an open front portion and a marking on the box to indicate when the box is empty.

17. The dispensing apparatus of claim 16, in combination with a package for containing products to be dispensed, the package including a mark with transaction information and retainer for acting to retain the mark with in a predetermined position in the box where the transaction information can be sensed.

18. The dispensing apparatus of claim 10, the door mechanism including an array of doors and the information sensor mechanism including optical detectors, each optical detector having a line of sight through an aperture at the dispensing station near a respective door in the array of doors.

19. A dispensing apparatus, comprising:

a housing;

a two-dimensional array of bins in the housing;

a dispensing station on the housing;

a mechanism coupled to the bins for moving any of the bins to the dispensing station;

a plurality of sensors, each of the sensors associated with a respective one of the bins, each of the sensors configured to read transaction information on a product residing in the bin, the transaction information identifying a recipient of the product;

a controller operatively associated with the plurality of sensors, the controller configured to maintain a bin data structure associating transaction information displayed on and read from a product in a specific bin with the location of that specific bin;

an entry device operatively associated with the controller for generating a request to dispense the product residing in the specific bin;

the controller further configured to signal the mechanism to move the specific bin to the dispensing station in response to the dispense request.

* * * * *